US009492922B1

(12) United States Patent
Johnson et al.

(10) Patent No.: US 9,492,922 B1
(45) Date of Patent: Nov. 15, 2016

(54) TECHNIQUES FOR MOBILE DEVICE CHARGING USING ROBOTIC DEVICES

(71) Applicant: Amazon Technologies, Inc., Seattle, WA (US)

(72) Inventors: Joseph Edwin Johnson, Seattle, WA (US); Michael Brian Stoops, Seattle, WA (US); Benjamin Schwartz, Seattle, WA (US); Nathan Eugene Masters, Redmond, WA (US); Shiblee Imtiaz Hasan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 33 days.

(21) Appl. No.: 14/673,744

(22) Filed: Mar. 30, 2015

(51) Int. Cl.
  *B25J 9/00* (2006.01)
  *B25J 9/16* (2006.01)
  *H02J 7/00* (2006.01)
  *H04L 29/08* (2006.01)
  *H04W 4/00* (2009.01)

(52) U.S. Cl.
  CPC ............. *B25J 9/161* (2013.01); *H02J 7/0004* (2013.01); *H04L 67/10* (2013.01); *H04W 4/008* (2013.01); *G05D 2201/02* (2013.01); *Y10S 901/01* (2013.01)

(58) Field of Classification Search
  CPC . B25J 9/161; B60L 11/1816; B60L 11/1827; B60L 11/1835; B60L 11/1848; G05D 1/021; G05D 2201/02; G05D 2201/0206; G05D 2201/0211; G05D 2201/0216; Y10S 901/01; Y04S 30/14
  See application file for complete search history.

(56) References Cited

U.S. PATENT DOCUMENTS

| 5,020,958 | A | * | 6/1991 | Tuttobene | G07F 7/069 221/88 |
|---|---|---|---|---|---|
| 9,056,555 | B1 | * | 6/2015 | Zhou | B60L 11/1827 |
| 9,378,607 | B1 | * | 6/2016 | Wine | G07F 11/002 |
| 2003/0234730 | A1 | * | 12/2003 | Arms | H02J 17/00 340/870.01 |
| 2009/0079388 | A1 | * | 3/2009 | Reddy | B60L 11/1818 320/109 |
| 2013/0030570 | A1 | * | 1/2013 | Shimizu | B25J 9/1679 700/259 |
| 2013/0166069 | A1 | * | 6/2013 | Ikeda | G01D 4/00 700/258 |
| 2014/0347017 | A1 | * | 11/2014 | Sugano | B60L 1/003 320/137 |

OTHER PUBLICATIONS

U.S. Appl. No. 14/673,764, filed Mar. 30, 2015, Titled: Techniques for Mobile Device Charging Using Robotic Devices.

* cited by examiner

*Primary Examiner* — Spencer Patton
(74) *Attorney, Agent, or Firm* — Kilpatrick Townsend & Stockton LLP

(57) ABSTRACT

A method, apparatus, and/or system for providing an action with respect to a mobile device using a robotic device that tracks the user and that interacts with a charging management engine. In accordance with at least one embodiment, a request to perform an action with respect to an electronic device is received. Information may be sent to one or more robotic devices within a proximity of the electronic device. A robotic device of the one or more robotic devices may be selected to perform the action. An indication may be received from the robotic device that indicates that the user has interacted with the robotic device. Instructions may be sent to the robotic device to perform the action with respect to the electronic device.

24 Claims, 13 Drawing Sheets

TECHNIQUES FOR MOBILE DEVICE CHARGING USING ROBOTIC DEVICES

CROSS-REFERENCE TO RELATED APPLICATIONS

The present disclosure is related to and incorporates by reference for all purposes the full disclosure of co-pending U.S. patent application Ser. No. 14/673,764, filed concurrently herewith, entitled "TECHNIQUES FOR MOBILE DEVICE CHARGING USING ROBOTIC DEVICES".

BACKGROUND

The general public uses electronic mobile devices such as cell phones, tablets, laptops, or the like to perform a myriad of daily tasks. It can be quite inconvenient to a user when one of these devices runs out of battery power. This is especially true if the user does not have an available charging adapter for the device. Users may find themselves asking friends, or even strangers, to borrow a charging adapter. In some cases, there may not be any charging ports, or power outlets in the immediate vicinity, making charging the device even more cumbersome. Even in cases where charging stations, ports, or outlets are available, a user may have to remain close to the device. For example, charging a phone in a public place may require the user to remain in the general area of the phone to avoid theft. For the aforementioned reasons, conventional techniques can make it difficult to charge electronic devices in a public or semi-public space.

BRIEF DESCRIPTION OF THE DRAWINGS

Various embodiments in accordance with the present disclosure will be described with reference to the drawings, in which.

DETAILED DESCRIPTION

Figure 1:
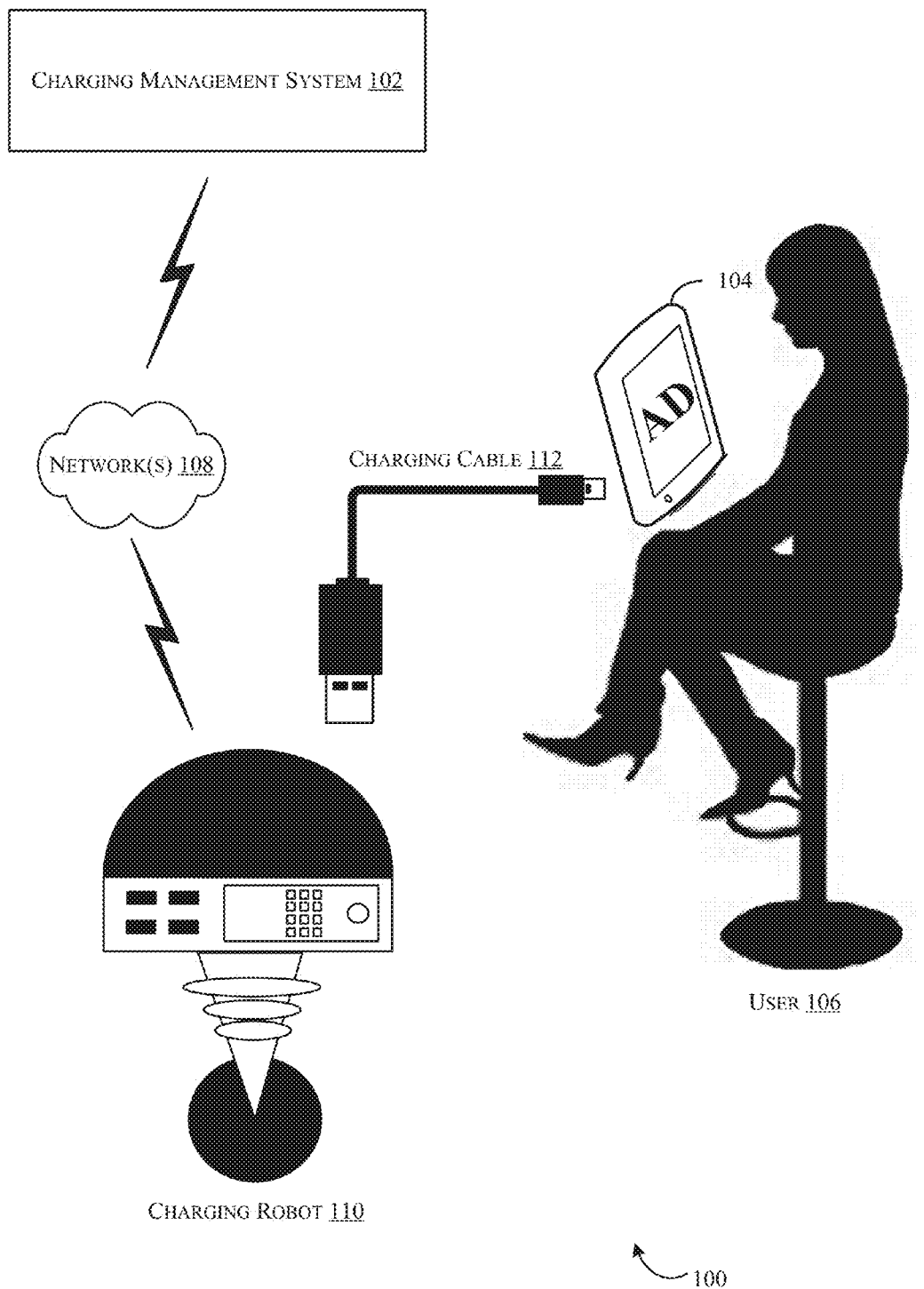
FIG. 1 is a pictorial diagram illustrating an example environment suitable for implementing aspects of a charging management system that utilizes a robotic device to provide charging capabilities to a mobile device, in accordance with at least one embodiment.

In the following description, various embodiments of the present disclosure will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to a charging management system that interacts with a robotic device to provide charging capabilities to a mobile device. In at least one example, a user may enter a public or semi-public space (e.g., an airport, a shopping center, a health-care center, a hotel, a place of business, or an educational institution). While at, for instance, an airport, the user's mobile phone may drop under a threshold of remaining battery power (e.g., 10%). The user may not have a charging cable with him or her, and/or there may not be an electrical outlet nearby. Using a charging application on his or her mobile electronic device, e.g., a smartphone, the user may request that a robotic device (hereinafter referred to as a "robot") come charge his or her phone. In the following disclosure, a "robot" is meant to include an autonomous, or semi-autonomous, electro-mechanical device that is guided by a computer program and/or electronic circuitry. The request may include at least one of a location of the mobile electronic device, a type of the mobile electronic device, a charge level of the mobile electronic device, or a request time. The request may be received wirelessly by a charging management system that manages mobile device charging via robots.

In response to the request, the charging management system may select a robot from a number of robots and communicate instructions to the robot to cause the robot to travel to the location of the user. Upon arriving at the user's location, the robot may be instructed by the charging management system to present the user with a number of user activities via a user interface (e.g., a touchscreen display, physical buttons located on the robot). "User activities," as used herein, is meant to refer to actions conducted by the user via the robot including, but is not limited to, viewing an advertisement, participating in a survey, participating in a crowd-sourcing activity that uses human intelligence to perform a task that a computer is incapable of performing, browsing for an item and/or conducting a purchase of the item from an electronic marketplace, using the robot to charge the electronic device (e.g., by attaching the electronic device to a port or other portion of the robotic device), and/or using an interface provided by the robot to pay a fee for charging the user's mobile electronic device, or the like. The user may select a user activity option corresponding to the user activity via the user interface and proceed with conducting various user interactions (e.g., further user interface selections, plugging an electronic device into a charging port of the charging robot, or the like) with the robot related to the selected user activity. In some cases, the user may select more than one user activity option. The user may participate in the selected user activity in exchange for charging his or her mobile electronic device and/or for entertainment purposes. As used herein, "charge" or "charging" refers to charging of an electronic device by a charging robot, "charge" or "charging" is not intended to refer to a payment of a fee, unless specified otherwise. As an overview, an "item" may be a product, a sellable unit, a good, or a service. As used herein, an "electronic marketplace" includes a computer-facilitated market for participants (e.g., buyers and sellers) to conduct transactions including commercial and/or financial transactions. A user may have an account with the charging management system and/or the electronic marketplace, and may provide credentials that permit the user to utilize the charging features of the robot. Upon completion of at least a portion of the user activity, the charging management system may instruct the robot to provide an interface (e.g., a cable and/or a port) to a power source (e.g., a battery with which the robot is equipped) to charge the user's mobile electronic device for a predetermined amount of time (e.g., 30 minutes). Upon completion of the predetermined charging time, the robot may cease charging automatically, or be instructed by the user and/or the charging management system to cease charging.

As an illustrative example, a user may arrive at an airport to catch a flight. Once there, his laptop may run low on battery power. As a result of the battery power falling below a threshold amount, an application on the laptop may transmit a charging request to the charging management system responsible for managing mobile device charging by charging robots in the airport. A charging request, as used herein, may include, but is not limited to, a location of an electronic device, information associated with the electronic device (e.g., device features, device configuration, etc.) a charging duration, an item request (e.g., an item for purchase accessible to the charging robot), and a start time. A prediction that the battery level will fall below a threshold within a period of time may also trigger transmission of the charging request. In a non-limiting example, the prediction may be determined based on the user's travel itinerary. For example, the user's travel itinerary may indicate that the user is about to embark on a 5-hour flight; however, the user may only have 3 hours of battery life remaining Electronic travel itinerary information may be obtained via an application running on the laptop, via user input of the itinerary information, or any suitable method for obtaining such information. Given a determination that the remaining battery life is less than the expected flight time, the application on the laptop may transmit a charging request to the charging management system. The charging request may be actively placed by the user, or may be transmitted automatically based on a setting (configuration) of the laptop (e.g., without input from the user).

The charging management system may transmit the charging request to a number of robots, at least one of which may be selected to assist the user in charging the user's laptop. The robots may communicate with one another, directly or through the charging management system, to select the robot that is best suited (e.g., is not currently busy fulfilling another charging request, has a requisite amount of battery power available to fulfill at least a threshold amount of the charging request, is located within a threshold proximity to the user, is located at a location that is a shortest path to the user with respect to other robots, or the like) to assist the user and/or charge the user's mobile device. Alternatively, the charging management device selects the robot best suited to assist the user. In some embodiments, the robot nearest the user is selected due to its proximity to the user. In other embodiments, the robot having the most battery power in reserve is selected. Alternatively, a robot that does not have the most battery power, but at least enough batter power to fulfill the charging request, may be selected. In yet other embodiments, some robots charge a same, or different, set of electronic devices as other robots. Accordingly, the robots that charge a set of electronic devices of which the laptop is a member, may be first identified. The robot that is nearest the user may then be selected from the robots that charge such electronic devices.

Assuming the nearest robot is best suited to charge the user's laptop, the nearest robot may make its way to the user based on the location of the laptop that was included in the charging request. The robot may utilize various sensors to navigate through the airport to the location of the laptop. Once there, the robot may be utilized to charge the user's laptop. As mentioned above, the robot may present a power source interface to which the user can attach his or her own charging adaptor. However, in other embodiments, the robot may carry, in a compartment located on the robot, a number of charging adaptors. The user may then utilize one of the adaptors to charge his or her laptop directly from the robot or from a nearby power source (e.g., a nearby electrical outlet). The user may then return the adaptor to the same or different robot, or to a return station. Alternatively, for a fee, the user may keep the adaptor and submit payment for the fee via the application referenced above or via the robot. In yet another example, the adaptor is configured for a single-use, and thus, may be disposed of in a recycling or other disposal container.

In some embodiments, the user may be assessed a fee for utilizing the robot to charge his or her mobile electronic device and may submit payment of the fee via the application referenced above or via the robot. However, in at least one embodiment, the fee may be waived or otherwise reduced or credited in exchange for conducting a user interaction with the robot and/or the application referenced above. For example, the fee may be waived or reduced in exchange for viewing an advertisement, participating in a survey, etc. via the user interface (e.g., touchscreen display) of the robot. In some embodiments, once the user interaction is concluded and the fee assessed/waived (or at another suitable time), the robot may then be utilized to charge the user's mobile electronic device.

As another example, a user may arrive at a shopping center. Once there, the user's tablet PC may drop below a threshold amount of remaining battery power. The user may issue a charging request to the charging management system responsible for managing mobile charging by robots at the shopping center. A robot may be sent to the user as described in the examples above. In one example, the user may choose to take part in a survey presented via a touchscreen display of the robot in exchange for 30 minutes of charging time. Once the survey is completed, the user may plug her tablet PC into the robot to begin charging the tablet PC. The robot may then alert the charging management system that charging of the tablet PC has commenced. In at least one embodiment, the charging management system may respond to the robot with instructions to "follow" the user (if the user moves to another location(s)) at a threshold distance for the duration of the charging time or for another suitable period of time. The robot may "follow" the user at a threshold distance or at approximately a threshold distance away.

Referring now to the drawings, in which like reference numerals represent like parts, FIG. 1 is a pictorial diagram illustrating an example environment 100 suitable for implementing aspects of a charging management system 102, in accordance with at least one embodiment. A user 106, upon occupying a portion of public space managed by charging management system 102, may utilize, for example, an electronic device (e.g., tablet PC 104) on network 108.

In at least one example, the user 106 notices that her electronic device, in this example, tablet PC 104, is in need of charging. At such time, user 106 may navigate, on tablet PC 104, to an application running on tablet PC 104. Using the application, user 106 may request charging from the charging management system 102. Charging management system 102, in communication via network 108, may determine a charging robot 110 to carry out the user's request.

Figure 2:
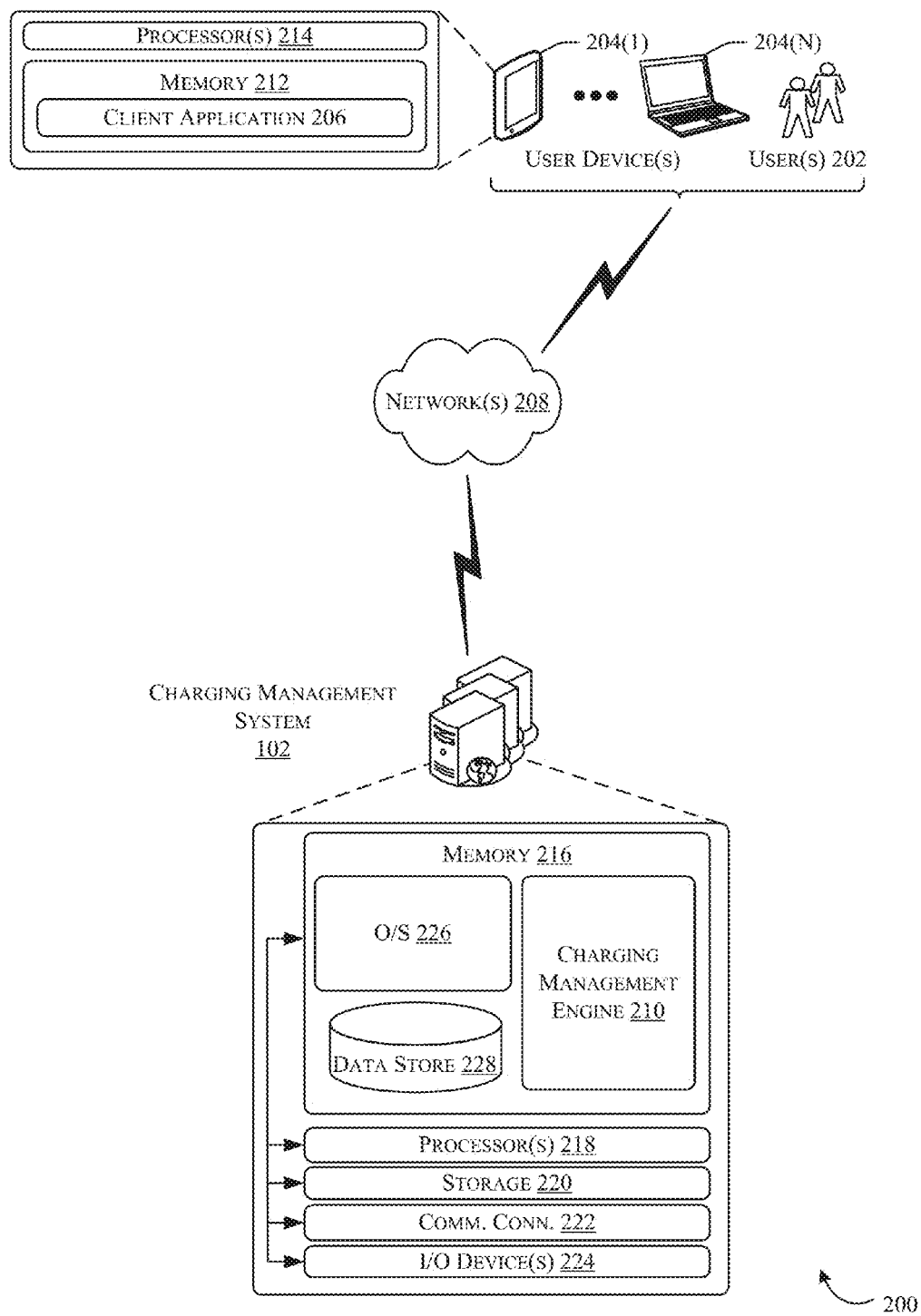
FIG. 2 is a block diagram illustrating an example architecture for a charging management system, in accordance with at least one embodiment.

FIG. 2 is a block diagram illustrating an example architecture 200 for the charging management system 102, in accordance with at least one embodiment. In architecture 200, one or more users 202 may utilize user computing devices 204(1)-(N) (e.g., the tablet PC of FIG. 1) to access a charging application 206 and/or a charging management engine 210 of the charging management system 102 via one or more networks 208. The charging management system 102 may include one or more computers that host, manage, and/or otherwise provide computing resources. The charging management system 102 may, in some examples, provide computing resources such as, but not limited to, client entities, low latency data storage, durable data storage, data access, management, virtualization, hosted computing (e.g., "cloud") based software solutions, electronic content performance management, etc. The charging management system 102 may also be operable to provide web hosting, computer application development, and/or implementation platforms, combinations of the foregoing, or the like to the one or more users 202, in addition to the charging management features described herein. The charging management system 102 may include any suitable type of computing devices such as, but not limited to, a mobile phone, a smart phone, a personal digital assistant (PDA), a laptop computer, a desktop computer, a server computer, a thin-client device, a tablet PC, etc. The multiple devices of the charging management system 102 may be arranged in a cluster of servers, as a server farm, or as individual servers not associated with one another. These servers may implement the charging management described herein as part of an integrated, distributed computing environment. Alternatively, or in addition, the charging management system 102 may be implemented with one more virtual machines implemented in a hosted computing environment. The hosted computing environment may include one or more rapidly provisioned and released computing resources, which computing resources may include computing, networking, and/or storage devices. A hosted computing environment may also be referred to as a "cloud" computing environment.

In some examples, the charging management system 102 may be in communication with the user computing devices 204 and/or other service providers via the networks 208 or via other network connections. In some examples, the networks 208 (e.g., the network 108 of FIG. 1) may include any one or a combination of many different types of networks, such as cable networks, the Internet, wireless networks, cellular networks, and other private and/or public networks. While the illustrated example represents the users 202 accessing the charging management system 102 over the networks 208, the described techniques may equally apply in instances where the users 202 interact with the charging management system 102 via the one or more user computing devices 204 over a landline phone, via a kiosk, or in any other suitable manner. It should be appreciated that the described techniques may apply in other client/server arrangements (e.g., set-top boxes, etc.), as well as in non-client/server arrangements (e.g., locally stored applications, peer-to-peer arrangements, etc.).

Client application 206, operating on user computing devices 204, may enable the users 202 to interact with the charging management system 102 such as to access information associated with the robots managed by charging management system 102 and/or the electronic devices being charged by the robots. The client application 206 may be capable of handling requests from many users 202 and presenting, in response, various user interfaces that can be rendered at the user computing devices 204. For example, client application 206 may present information related to charging robots (e.g., the charging robot 110), such as location, charging capabilities, charging capacity, item purchase availability, user activity availability, display information, or the like. Client application 206 may present such information to the users 202 via a graphical user interface as well as process and transmit user interaction information related to actions taken by the user with respect to the graphical user interfaces. The charging management system 102 may cause client application 206 to present any suitable type of network site that supports user interaction.

The user computing devices 204 may be any suitable type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user computing devices 204 may be in communication with the charging management system 102 via the networks 208, or via other network connections. Additionally, the user computing devices 204 may be part of a distributed system managed by, controlled by, or otherwise part of the charging management system 102.

In one illustrative configuration, the user computing devices 204 may include at least one memory 212 and one or more processing units (or processor(s)) 214. The processor(s) 214 may be implemented as appropriate in hardware, firmware, or as hardware or firmware implementing computer-executable instructions executed by hardware, firmware, or as hardware or firmware executing computer-executable or machine-executable instructions written in any suitable programming language to perform the various functions described.

The memory 212 may store program instructions that are loadable and executable on the processor(s) 214, as well as data generated during the execution of these programs. Depending on the configuration and type of user computing device, the memory 212 may be volatile (such as random access memory (RAM)) and/or non-volatile (such as read-only memory (ROM), flash memory, etc.). The user computing devices 204 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 212 may include multiple different types of memory, such as static random access memory (SRAM), dynamic random access memory (DRAM), or ROM.

Turning to the contents of the memory 212 in more detail, the memory 212 may include an operating system and one or more application programs, modules, or services for implementing the features disclosed herein including the client application 206 or dedicated applications (e.g., smart phone applications, tablet applications, etc.). The client application 206 may receive, store, and/or display a network page or other interface for interacting with the charging management system 102. Memory 216 of the charging management system 102 may store access credentials and/or other user information such as, but not limited to, user IDs, passwords, one or more images, radio frequency identification information, and/or other user information. In some examples, the user information may include information for authenticating an account access request such as, but not limited to, a device ID, a cookie, an IP address, a location, a bar code (2- or 3-dimensional), an image, an electronic user code, (e.g., that can be stored in an a radio frequency ID tag) or the like.

Returning to the charging management system 102, in one illustrative configuration, a device included in the charging management system 102 may include at least one memory 216 and one or more processing units (or processor(s)) 218. The processor(s) 218 may be implemented as appropriate in hardware, firmware, or as hardware or firmware implementing computer-executable instructions executed by hardware, firmware, or as hardware or firmware executing computer-executable or machine-executable instructions written in any suitable programming language to perform the various functions described.

The memory 216 may store specific computer-executable instructions that are loadable and executable on the processor(s) 218, as well as data generated during the execution of these instructions. Depending on the configuration of the charging management system 102, the memory 216 may be volatile (such as RAM) and/or non-volatile (such as ROM, flash memory, etc.). Devices of the charging management system 102 may also include additional storage 220, which may include removable storage and/or non-removable storage. The additional storage 220 may include, but is not limited to, magnetic storage, optical disks and/or tape storage. The disk drives and their associated non-transitory computer-readable media may provide non-volatile storage of computer-readable instructions, data structures, program modules, and other data for the devices of the charging management system 102. In some implementations, the memory 216 may include multiple different types of memory, such as SRAM, DRAM, or ROM.

The memory 216, the additional storage 220, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 216 and the additional storage 220 are all examples of computer storage media. Additional types of non-transitory computer-readable storage media may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the charging management system 102. Combinations of any of the above should also be included within the scope of non-transitory computer-readable media.

Devices of the charging management system 102 may also contain communications connection(s) 222 that allow communication with a stored database, another computing device or server, user terminals and/or other devices on the networks 208. Devices of the charging management system 102 may also include I/O device(s) 224, such as a keyboard, a mouse, a pen, a voice input device, a touch input device, a display, speakers, a printer, etc.

As will be discussed in further detail in FIG. 4, the memory 216 may include an operating system 226, one or more data stores 228, and/or one or more application programs, modules, or services for implementing the features disclosed herein including the charging management engine 210.

Figure 3:
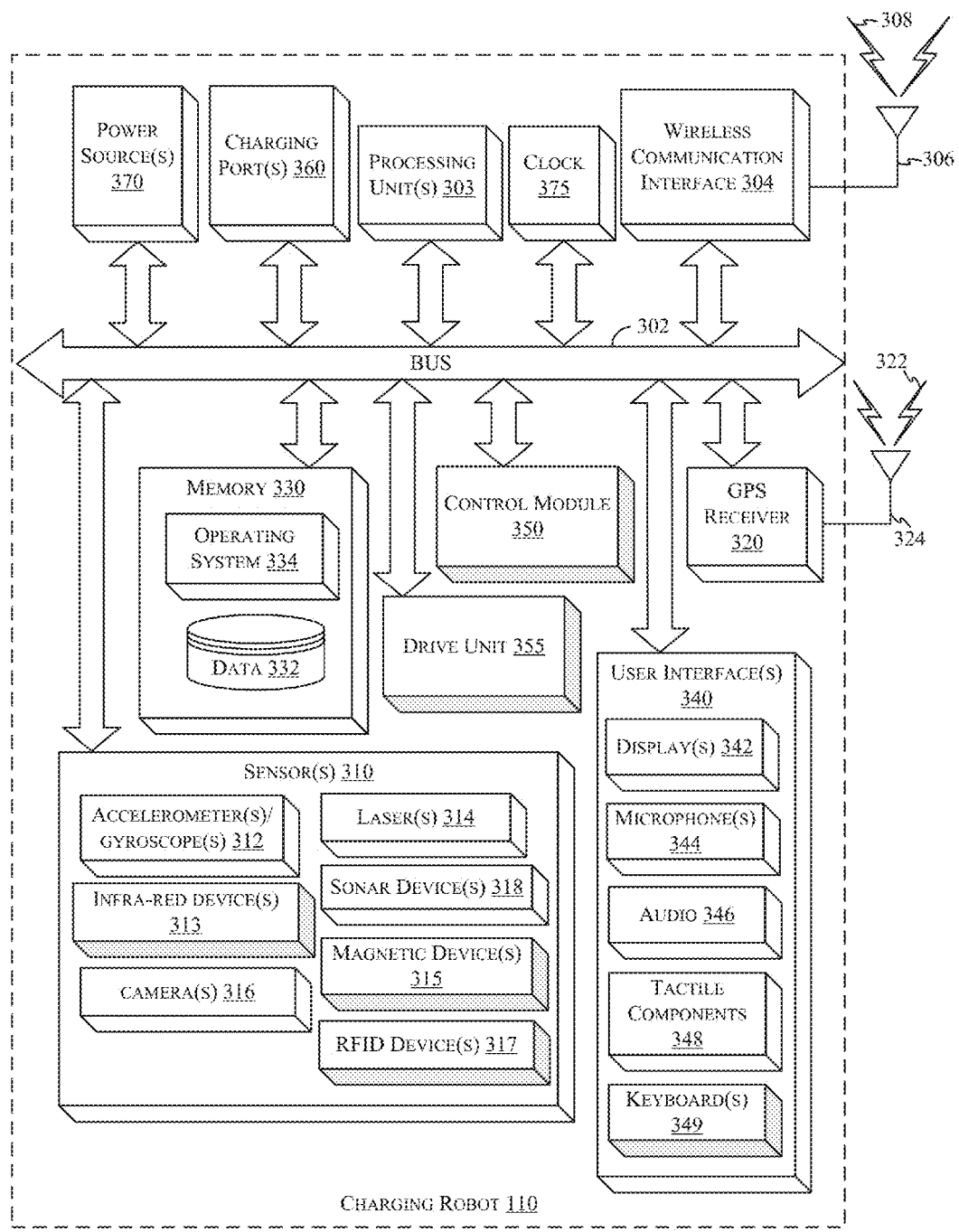
FIG. 3 is a block diagram illustrating an example architecture of the robotic device shown in FIG. 1 that is configured to be utilized by the charging management system, in accordance with at least one embodiment.

FIG. 3 is an example architecture of a charging robot 110 utilized by the charging management system 102, in accordance with at least one embodiment. It should be noted that FIG. 3 is meant only to provide a generalized illustration of various components of charging robot 110, any or all of which may be utilized as appropriate. Moreover, the various components of the charging robot 110 may be implemented in a relatively separated or relatively more integrated manner.

The charging robot 110 is shown comprising hardware elements that can be electrically coupled via a bus 302 (or may otherwise be in communication, as appropriate). The hardware elements may include a processing unit(s) 303 which can include without limitation one or more processors (which may, in some embodiments include, digital signal processors (DSPs), application specific integrated circuits (ASICs), and/or the like), and/or other processing units, which can perform one or more of the methods described herein.

The charging robot 110 might also include a wireless communication interface 304, which can include without limitation a modem, a network card, an infrared communication device, a wireless communication device, and/or a chipset (such as a Bluetooth device, an IEEE 802.11 device, an IEEE 802.15.4 device, a Wi-Fi device, a WiMax device, cellular communication facilities, etc.), and/or the like. The wireless communication interface 304 may permit data to be exchanged with a network, wireless access points, other computer systems, and/or any other electronic devices described herein. The communication can be carried out via one or more wireless communication antenna(s) 306 that send and/or receive wireless signals 308. In at least one embodiment, charging robot 110 may communicate with charging management system 102 via the wireless communication interface 304.

Depending on desired functionality, the wireless communication interface 304 can include separate transceivers to communicate with base transceiver stations (e.g., base transceiver stations of a cellular network) and access points. These different data networks can include, an Orthogonal Frequency-Division Multiple Access (OFDMA), Code Divisional Multiple Access (CDMA), Global System for Mobile Communications (GSM)), and/or other types of networks.

The charging robot 110 can further include sensor(s) 310. Such sensors can include, without limitation, one or more accelerometer(s) and/or gyroscope(s) 312, infra-red device(s) 313, laser(s) 314, magnetic device(s) 315, imaging device(s) (e.g., camera(s)) 316, radio frequency identification (RFID) device(s) 317, sonar device(s) 318, or the like. At least a subset of the sensor(s) 310 can provide readings used by charging robot 110 for navigation, user authentication, user interaction, or image detection as described herein. In at least one example, sensor(s) 310 of charging robot 110 may be used to collect authentication data for authenticating a user (e.g., via a retina scan, via finger print scan, via an image of the user, via a radio frequency, or the like). Sensor(s) 310 may also be used to collect interaction data indicating a user interaction with the charging robot 110 (e.g., physical and/or audible interaction including motions made by the user and/or sounds made by the user.). Sensors may also be used to collect user navigation data for obtaining a location of the user (e.g., GPS coordinates, sonar reading, infra-red readings, etc.). Sensor(s) 310 may be used to collect device navigation data for obtaining a location of the charging robot 110. Sensor(s) 310 may also be used to identify one or more obstacles falling within a threshold distance of a traversal path (e.g., a sequence of headings between two locations) of the charging robot 110. In accordance with at least one embodiment, sensor(s) 310 may be used, by the charging management system 102, to track or determine the location of the user and/or to track or determine the location of the robotic device. Sensor data collected by sensor(s) 310 may be utilized by the charging management system 102 when determining a particular charging robot (e.g., the charging robot 110) to select to fulfill a charging request, when determining a traversal path for the charging robot 110, or when causing the charging robot 110 to maintain a threshold distance with the user (e.g., to "follow" the user).

Embodiments of charging robot 110 may also include a Global Positioning System (GPS) receiver 320 capable of receiving signals 322 from one or more GPS satellites using a GPS antenna 324. Such positioning can be utilized to complement and/or incorporate the techniques described herein. The GPS receiver 320 can receive satellite data that can be transmitted via wireless communications interface 304 or stored in memory 330. The satellite data can be information sufficient to allow the GPS receiver 320 to determine a geographic location of the charging robot 110 based on the satellite data. It can be noted that, as used herein, a GPS may include any combination of one or more global and/or regional navigation satellite systems and/or augmentation systems, and GPS signals may include GPS or GPS-like signals. The charging robot 110 may further include or be in communication with a memory 330. The memory 330 is an example of a non-transitory computer-readable storage media. In at least one example, non-transitory computer-readable storage media include volatile or non-volatile, removable or non-removable, media implemented in any method or technology for storage of information such as computer-readable instructions, data structures, program modules, or other data. Additional types of non-transitory computer-readable storage media that may be included in the charging robot 110 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the charging robot 110. Combinations of any of the above should also be included within the scope of non-transitory computer-readable media. Memory 330 can further be used to store sensor data for any combination of sensors 310 in data store 332. Additionally, or alternatively memory 330 may be used to store user information obtained via a user interface(s) 340 of the charging robot 110.

Turning to the contents of the memory 330 in more detail, the memory 330, in at least one embodiment, includes an operating system 334 and one or more application programs, modules, or services for implementing the features of the charging robot 110 or dedicated applications. In at least one example embodiment, the charging robot 110 receives, stores, and/or displays content and presents the user interface(s) 340 for interacting with the charging management system 102 of FIG. 2 and/or one or more users (e.g., users 202 of FIG. 2). Additionally, the memory 330 may store access credentials and/or other user information such as, but not limited to, user IDs, passwords, one or more images, radio frequency identification information, and/or other user information. In some examples, the user information includes information for authenticating an account access request such as, but not limited to, a device ID, a cookie, an IP address, a location, an image, an RFID code, or the like. The memory 330 of the charging robot 110 also can include device drivers, executable libraries, application programs, computer programs, and/or other code that may be designed to implement methods, and/or configure systems, as described herein.

The charging robot 110 may also include a user interface(s) 340. Components of the user interface(s) 340 may include display(s) 342, microphone(s) 344, audio component(s) 346, tactile component(s) 348, or keyboard(s) 349. The user interface(s) 340 may enable a user (e.g., user 106 of FIG. 1) to interact with the charging robot 110 and/or the charging management system 102 of FIG. 2. In one example, tactile component is 348 may include a refreshable braille display and/or braille keyboard to provide the user an interface with which to read braille. Display(s) 342 may include a monitor, a touchscreen display device, a projector, or any suitable device for visually displaying information to a user.

The charging robot 110 may also include power source(s) 370. In at least one embodiment, charging robot 110 may operate under battery control. For example, the power source(s) 370 may include any combination of a flow battery, a fuel cell battery, a lead-acid battery, a lithium air battery, a lithium-ion battery, a nickel-based battery, a polymer-based battery, a potassium-based battery, a silicon-based battery, a silver-based battery, a sodium-based battery, and/or any suitable rechargeable battery. In accordance with at least one embodiment, the charging robot 110 includes charging port(s) 360. Charging port(s) 360 may be configured to charge a number of electronic devices. For example, charging port(s) may include any suitable combination of one or more USB charging ports, one or more inductive couplers, one or more capacitive couplers, one or more magneto-dynamic couplers, one or more A/C outlets, or any suitable port(s)/outlet(s) configured to receive one end of a charging cable utilized to charge an electronic device. The charging robot 110 can provide A/C power through the one or more A/C outlets even though it is not connected to an A/C source, by way of a power inverter that may convert the D/C power from the power source(s) 370 to A/C power for the charging port(s) 360. In some embodiments, the power source(s) 370 and/or charging port(s) 360 of the charging robot 110 are configured to provide rapid charging of the electronic device being charged. The electronic device being charged may include any combination of batteries, such as those described above. The charging port(s) 360 may transfer electrical current from the power source(s) 370 to one or more batteries located on an electronic device while the electronic device is connected to the robot via the charging port(s) 360 (e.g., via a USB cable). Additionally, or alternatively, the charging port(s) 360 may include a charging pad, or other suitable wireless power transfer device, capable of wirelessly transferring electrical power from the power source(s) 370 to a battery located on an electronic device (e.g., via capacitive couplers, via electromagnetic inductive couplers, via inductive couplers, etc.). Thus, the battery located on the electronic device may be charged merely by being located within a threshold proximity of the charging port(s) 360.

In accordance with at least one embodiment, charging robot 110 includes a software module (control module 350) for controlling components of drive unit 355. In at least one example, control module 350 may be included in memory 330 or as a separate module. Control module 350 may execute operations to control various motors and/or actuators contained in drive unit 355 located on charging robot 110. Motors and actuators are both intended to refer to a device that converts energy (e.g., electrical) into physical motion. Typically, "motors" refer to devices that convert energy into linear motion (e.g., cause the robot to move to a different location), while "actuators" typically convert energy into rotational motion (e.g., allow a robot hand to rotate on an axis, for example, to rotate a doorknob). Such motors and/or actuators contained in drive unit 355 may be responsible for movement of the robot. Control module 350 may execute operations that coordinate movement between various motors and actuators in order to propel, halt, or otherwise move various portions of the robot in a coordinated manner (e.g., move the robot to another location, move an appendage of the robot, rotate a "head", etc.). Control module 350 may execute operations to control various functions of charging robot 110, such as those functions pertaining to any suitable component or module described in FIG. 3.

In accordance with at least one embodiment, charging robot 110 includes a clock 375. Clock 375 may be used to generate a time stamp for each of the data observations generated by the sensor(s) 310. The time stamps may be used by the processing unit(s) 303 in the analysis of sensor data, and facilitate pattern recognition and improved capacity for determining the operational environment of the charging robot 110. The clock 375 may be used to ascertain a time at which the charging port(s) 360 are disabled. The clock 375 can also be used by the processing units 303 for alarms and other standard clock functions.

Figure 4:
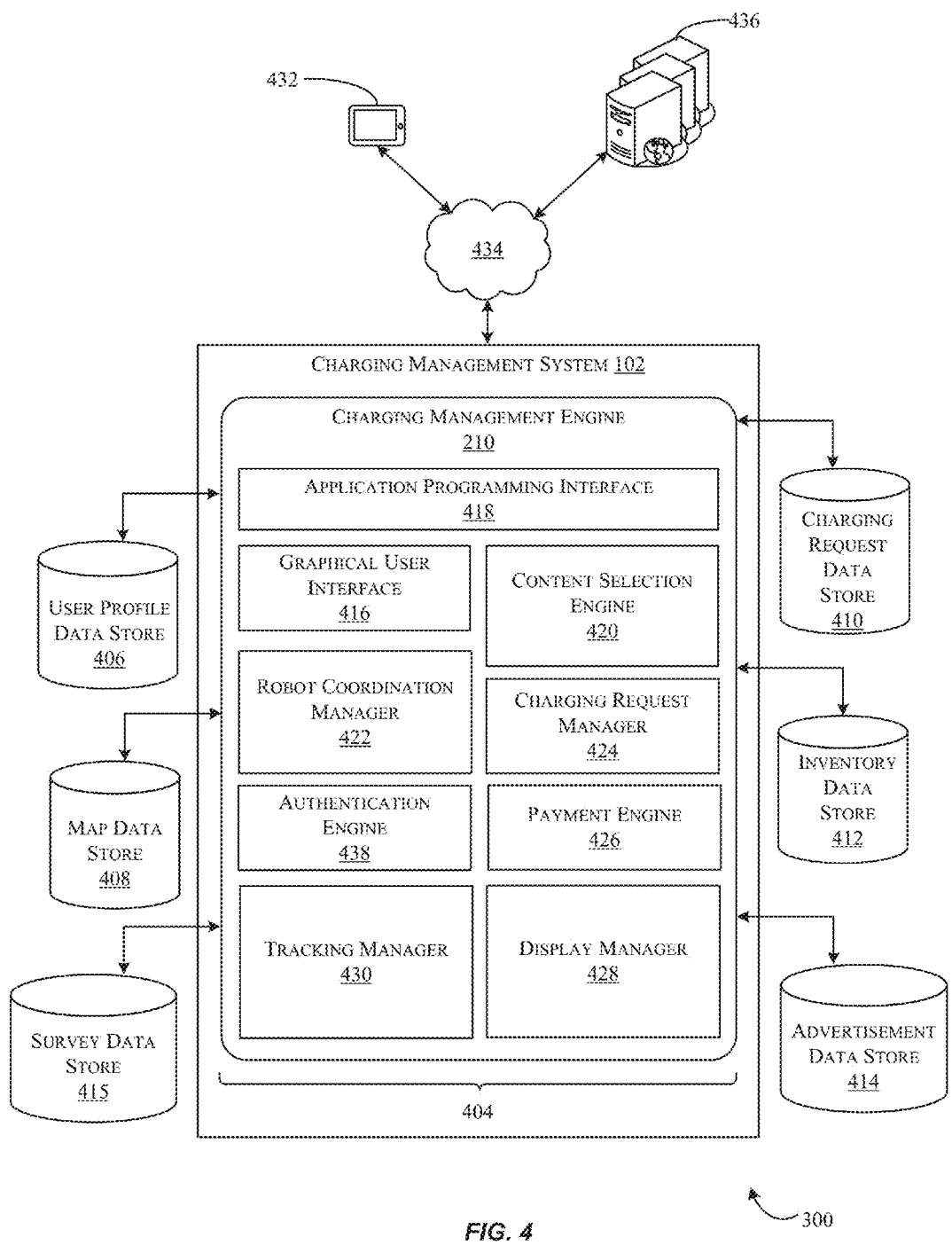
FIG. 4 is a block diagram illustrating an example computer architecture for a charging management engine that may be implemented by the charging management system to carry out various embodiments.

FIG. 4 is a block diagram illustrating an example computer architecture 400 for a charging management engine 210 that may be implemented by the charging management system 102 (e.g., the charging management system 102 of FIGS. 1 and 2) including a plurality of modules 404 that may carry out various embodiments. The modules 404 may be software modules, hardware modules, or a combination thereof. If the modules 404 are software modules, the modules 404 can be embodied on a non-transitory computer readable medium and processed by a processor in any of the computer systems described herein. It should be noted that any module or data store described herein, may be, in some embodiments, a service responsible for managing data of the type required to make corresponding calculations. The modules 404 may be configured in the manner suggested in FIG. 4 or the modules 404 may exist as separate modules or services external to the charging management engine 210.

In the embodiment shown in the drawings, a user profile data store 406, a map data store 408, a charging request data store 410, an inventory data store 412, an advertisement data store 414, and a survey data store 415 are shown, although data can be maintained, derived, or otherwise accessed from various data stores, either remotely or locally, to achieve the functions described herein. The charging management engine 210, shown in FIG. 4, includes various modules such as a graphical user interface 416, the application programming interface 418, content selection engine 420, a robot coordination manager 422, a charging request manager 424, a payment engine 426, a display manager 428, a tracking manager 430, and an authentication engine 438. Some functions of the modules 416, 418, 420, 422, 424, 426, 428, 430 and 438 are described below. However, for the benefit of the reader, a brief, non-limiting description of each of the modules is provided in the following paragraphs.

In accordance with at least one embodiment, a process is enabled for utilizing charging management system 102. For example, a user (e.g., user 106 of FIG. 1) may utilize user device 432 (e.g., user device(s) 204 of FIG. 2) to interact, via network 434 (e.g., network(s) 208 of FIG. 2) with charging management system 102 to receive a charging request. As part of a charging management process, or at any suitable time, a charging request may be received by the charging management engine 210 via application programming interface 418 and graphical user interface 416, both components of the charging management engine 210. It should be appreciated that the networks 434 may be the same or similar as the networks 208 described in connection with FIG. 2. Application programming interface 418 and/or graphical user interface 416 may be utilized in any suitable example described herein as a means for receiving information by the charging management engine 210.

In accordance with at least one embodiment, charging request manager 424 (a component of the charging management engine 210) receives a charging request. A charging request may include information including, but not limited to, any suitable combination of information associated with the user 106 (e.g., user ID, a location associated with the user), an electronic device type, a charging level associated with the electronic device, a duration, a distance, a traversal path, or a request time. Upon receipt of such a charging request, charging request manager 424 may store the charging request in charging request data store 410, which stores such change requests. In at least one example, charging request manager 424 determines an order with which to process stored change requests. This order may be based, at least in part, on a time at which the charging request was received. Additionally, or alternatively, the order may be based, at least in part, on the charging level associated with the electronic device. Upon processing a charging request, charging request manager 424 may communicate the charging request to content selection engine 420.

In accordance with at least one embodiment, robot coordination manager 422 (a component of the charging management engine 210) sends, via the application programming interface 418, information related to the charging request to one or more charging robots (e.g., the charging robot 110 of FIG. 1). Additionally, or alternatively, robot coordination manager 422 may receive, via application programming interface 418, information from one or more charging robots. For example, upon receiving a charging request from the charging request manager 424, robot coordination manager 422 may transmit information related to the charging request to a charging robot 110. Charging robot 110 may respond with an indication of whether it is able to process the charging request. Charging robot 110 may determine its ability to process the charging request based, at least in part, on the charging level of the electronic device and/or an amount of charge requested as indicated in the charging request. For example, if the charging level indicates that the electronic device is in need of a charge amount that exceeds an amount the charging robot 110 is currently able to provide, the charging robot 110 may respond with an indication that it is not the best suited charging robot to process the charging request. For example, the charging robot 110 may currently have a battery level that, aside from operating the charging robot 110 itself, is insufficient to charge a battery of the electronic device up to a threshold amount of the electronic device battery's full capacity or to the requested amount of charge. Such threshold may be user or developer specified and/or determined by one or more rules of the charging management engine 210.

In accordance with at least one embodiment, robot coordination manager 422 may receive a number of responses from one or more charging robots. Upon receipt of a response from the one or more charging robots, Robot coordination manager 422 may select a particular charging robot (e.g., the charging robot 110) with which to carry out the charging request. While communicating with a one or more charging robots, robot coordination manager 422 may receive information associated with user input collected by the charging robot 110, display data to present on the charging robot 110, sensor data received from the charging robot 110, navigation information transmitted to and received from the charging robot 110, or any suitable information capable of being exchanged with the one or more charging robots. It should be noted, that information may be exchanged between robot coordination manager 422 and the charging robot 110 and/or between the robot coordination manager 422 and any suitable component of the charging management engine 210. As a non-limiting example, robot coordination manager 422 may communicate payment information of the user (e.g., entered via user interface(s) 340) to payment engine 426 in order to complete a purchasing transaction. As a further example, robot coordination manager 422 may communicate information to be displayed on the charging robot 110 to display manager 428. In yet another example, robot coordination manager 422 may communicate locational information related to the robot and/or the user to map data store 408 for storage or other suitable processing.

In accordance with at least one embodiment, robot coordination manager 422 may coordinate movement of one or more charging robots (e.g., the charging robot 110). For example, robot coordination manager 422 may utilize a map (e.g., an electronic representation of an area) obtained from map data store 408. The map may include data describing an area surrounding the charging robot 110 and/or the user (e.g., the location of walls, egress/ingress paths, obstacles, locations of places and/or objects within a map region, distances between elements (objects/places) of the map, etc.). The robot coordination manager 422 may utilize the map data and sensor data collected from sensor(s) 310 to identify walls, egress/ingress routes, doors, obstacles between the charging robot 110 and the user, as the user and/or the charging robot 110 change position. In a non-limiting example, laser(s) 314 of FIG. 3 may be used to determine a location and proximity of a user with respect to the charging robot 110. Additionally, sensor data collected using laser(s) 314 may be used to determine location and proximity of people and objects other than the user. Sensor data collected by the laser(s) 314 may be used to determine and/or update the charging robots 110 traversal path (e.g., a sequence of headings between two locations). The traversal path may be a determined using an initial location of the charging robot 110 and the user and/or destination location. Additionally, the traversal path may be periodically updated by the robot coordination manager 422, for example, based on collected sensor data (e.g., indicating a location, speed, heading, etc. of a user). In accordance with at least one embodiment, the robot coordination manager 422 may utilize any suitable combination of map data, information from one or more charging requests, and/or sensor data to calculate a traversal path for the charging robot 110 to follow (e.g., to travel from an initial location of the charging robot 110 to the location of the user of the charging request).

In accordance with at least one embodiment, robot coordination manager 422 may coordinate movement of one or more charging robots (e.g., the charging robot 11) using a video feed. For example, video feed information may be received by robot coordination manager 422. Once received, the video feed information may be analyzed (e.g., utilizing image recognition techniques) to identify a user. Based on a map of the surrounding area of the user (e.g., an electronic floor plan of an airport), a location of the user may be determined by comparing data from the video feed (e.g., information of the identified user's surroundings) and map data. For example, the video feed may depict the user standing next to a merchant store. The merchant store may have a sign that is visible in the video feed. Text recognition techniques may be utilized to analyze the video feed to determine the name of the store. The name of the store may be used to identify a location on the map. Additionally, distance may be determined from the video feed by determining a known frame of reference (e.g., a sign that is known to be 20 feet away from the device used to capture the video feed). The known frame of reference may be used to compare size of an object (e.g., at a particular angle) depicted in the video feed. An estimated distance may be computed (e.g., by the robot coordination manager 422) based on such a comparison. It should be noted that video feed information may be used separately, or in conjunction with sensor data collected by sensor(s) 310 on the charging robot 110 to track a user and/or a robotic device.

In accordance with at least one embodiment, content selection engine 420 (a component of the charging management engine 210) receives, via the application programming interface 418 and robot coordination manager 422, user information from one or more charging robots (e.g., the charging robot 110 of FIG. 1). As a non-limiting example, a user may enter, at a graphical user interface on the charging robot 110, user login information related to an electronic marketplace. Upon receipt of such login information, the content selection engine 420 may use the login information to interact with user profile data store 406 in order to obtain user profile information with which to determine one or more user activity options to provide to the user. The term "user activity options" is intended to refer to one or more graphical interface elements that, upon selection by the user, enable the user to participate in one or more user activities using the robot (e.g., viewing an advertisement, participating in a survey, participating in a human intelligence task, browsing for and/or conducting a purchase of an item from an electronic marketplace, charging an electronic device, paying a fee to charge an electronic device, or the like). User profile data store 406 may store user profile information associated with a user of an electronic marketplace. Such user profile information may include, but is not limited, user demographic information, past purchase history, past viewed items, or the like.

As a non-limiting example, the content selection engine 420 may obtain user profile data from user profile data store 406 using the user login information received from charging robot 110 as discussed above. Content selection engine 420 may utilize user profile data in order to select, for example, an option to present to the user to view an advertisement (e.g., an advertisement featuring an item offered on an electronic marketplace, a service, a marketing campaign, or the like) in exchange for charging time with the charging robot 110. In such cases, the content selection engine 420 may interact with advertisement data store 414 that stores a number of electronic advertisements. In at least one example, the content selection engine 420 may determine that a number of electronic advertisements exist that are related to an item or an item category of an item that has been previously purchased by the user. In response to the determination, the content selection engine 420 may provide the user with the option to view the advertisement in exchange for charging time with the charging robot 110.

As a further example, the content selection engine 420 may interact with inventory data store 412 that stores information related to a number of items in inventory, the items being accessible by the charging robot 110 of FIG. 1. Items, in this sense, may include electronic items (e.g., electronic games) or tangible goods. The content selection engine 420 may determine that one or more items are accessible by the charging robot 110 and may present the user with the user activity option to purchase one or more items in exchange for charging time with the charging robot 110. The determination to offer the one or more items in exchange for charging time may further be based on the login information/user profile information previously obtained. For example, the content selection engine 420 may determine the one or more items to present to the user based on accessibility with respect to the charging robot 110 and/or previous purchase information of the user. In at least one example, a user may have previously purchased an electronic device from an electronic marketplace. Further, a charger for the electronic device may be accessible (e.g., current on-board the charging robot 110, or accessible by the charging robot 110) to the charging robot 110. Thus, the content selection engine 420 may determine that a user activity option for purchasing the charger may be presented to the user via the charging robot 110 based on the previous purchase information and/or the accessibility of the charger with respect to the charging robot 110.

In other non-limiting examples, content selection engine 420 may determine one or more surveys, stored in survey data store 415, to present to the user as a user activity option. Additionally, or alternatively, content selection engine 420 may determine a number of possible user activity options based on at least one of user profile data, available advertisements, available surveys, available item inventory accessible to charging robot 110, or a predetermined number of possible user activity options. Predetermined user activity options may include, but are not limited to, viewing a network page of an electronic marketplace, participating in a crowd-sourcing activity, or the like. Such predetermined user activity options may be selected without consideration to profile information of the user.

In accordance with at least one embodiment, display manager 428 (a component of the charging management engine 210) causes information to be displayed on the charging robot 110. For example, display manager 428 may receive possible user activity information from content selection engine 420 (e.g., survey identifier(s), advertisement identifier(s), inventory item identifier(s)). Display manager 428 may interact with survey data store 415, inventory data store 412, or advertisement data store 414 in order to provide display instructions to communicate user activity options directly to charging robot 110, or alternatively, via robot coordination manager 422.

In accordance with at least one embodiment, tracking manager 430 (a component of the charging management engine 210) receives, via application programming interface, sensor data from one or more charging robots (e.g., the charging robot 110 of FIG. 1). Sensor data may include any readings taken by one or more of sensor(s) 310 of FIG. 3. Tracking manager 430 may estimate a user location based on the sensor data. Tracking manager 430 may further communicate, via application programming interface 418, or alternatively, robot coordination manager 422, data related to the estimated user location.

In accordance with at least one embodiment, payment engine 426 (a component of the charging management engine 210) receives, via application programming interface 418, payment information associated with the user. For example, payment engine 426 may receive indication from service provider computers 436 that the user has purchased an item from an electronic marketplace. Additionally, or alternatively, payment engine 426 may receive information indicating that the user wishes to purchase an item accessible to the charging robot 110. Payment engine 426 may process payment information in order to complete a purchase or lease.

In accordance with at least one embodiment, authentication engine 438 (a component of the charging management engine 210) receives, via application programming interface 418, authentication information associated with the user. For example, authentication engine 438 may receive a radio frequency associated with a RFID device (e.g., the RFID device(s) 317 of FIG. 3). In at least one example, authentication engine 438 may receive authentication data in the form of a picture or video captured by, for example, imaging device(s) 316 of FIG. 3. Additionally, or alternatively, authentication engine 438 may receive authentication data from the user via user interface(s) (e.g., user interface(s) 340 of FIG. 3). The authentication engine 438 may authenticate the user by utilizing information contained in a data store (e.g., user profile data store 406). In at least one example, authentication data may be processed using image recognition techniques or audio recognition techniques.

Figure 5:
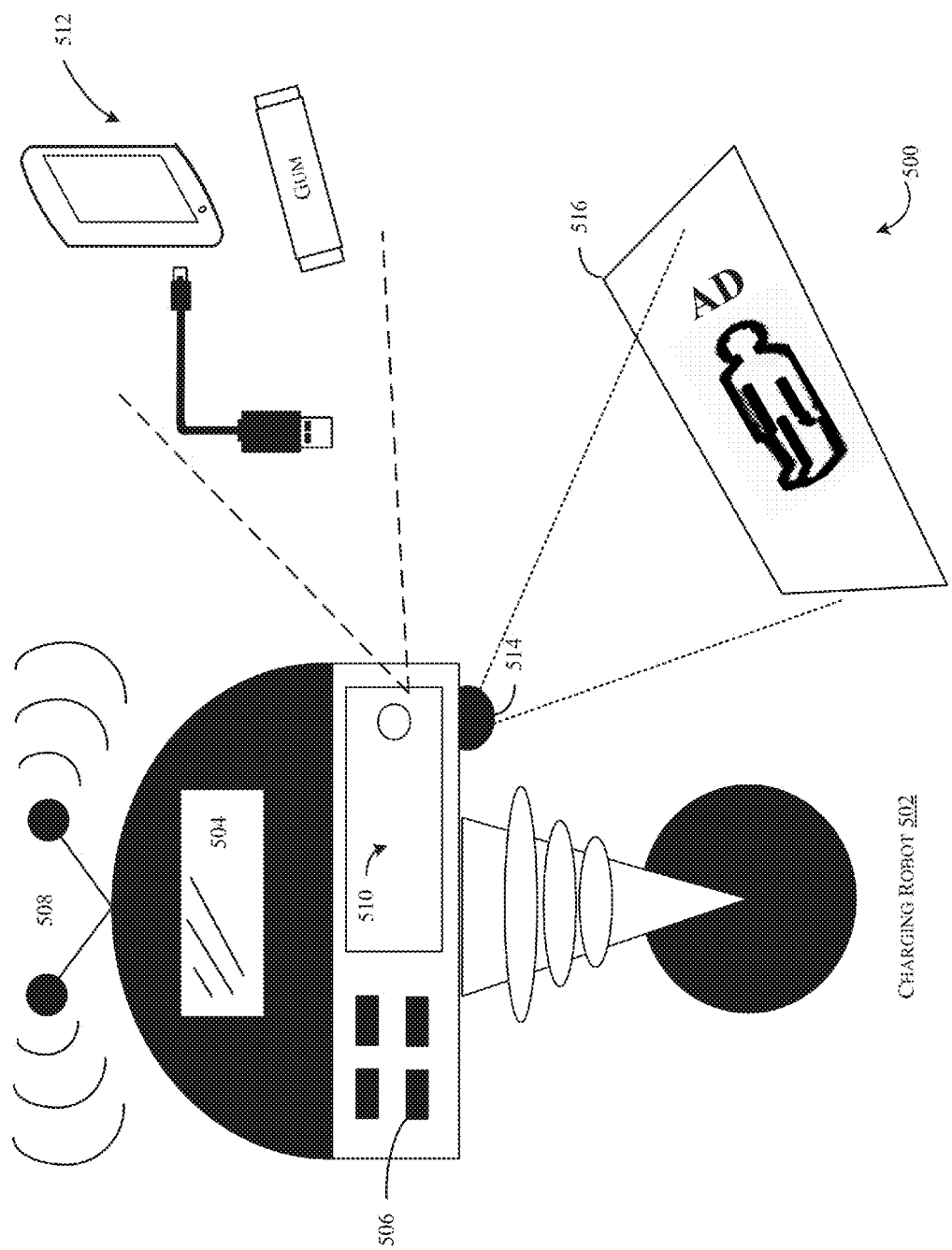
FIG. 5 is a pictorial diagram of an example robotic device to be utilized by the charging management system, in accordance with at least one embodiment.

FIG. 5 is a pictorial diagram of an example robotic device 502 (e.g., the charging robot 110 of FIG. 1) utilized by charging management system 102 of FIG. 1. The robotic device 502 is merely one example of a robotic device capable of being utilized by user 106 or charging management system 102, and thus, should not be construed as limiting. It should be noted that the following features depicted in FIG. 5 are not necessarily to scale.

In accordance with at least one embodiment, the robotic device 502 includes a variety of features, including but not limited to the features described below and/or above in connection with FIG. 3. The robotic device 502 may take any variety of forms. For example, the robotic device 502 may be a ball robot, a cart-based robot, a multi-legged robot, a quadruped robot, a wheeled robot, a modular snake robot, a humanoid robot, or the like. Moreover, the charging robots managed by the charging management system 102 may be the same type or form of robot, or may include robots of different types or forms.

In the example depicted in FIG. 5, the robotic device 502 is a ball robot. A "ball robot," as used herein, is intended to refer to a mobile robot designed to balance on a single spherical wheel (e.g., a ball). Through a single contact point with the ground, a ball robot is omnidirectional and thus exceptionally agile, maneuverable, and organic in motion compared to other ground vehicles. Its spherical wheel enables navigability in narrow and crowded environments. A ball robot works on the same principle as that of an inverted pendulum.

The robotic device 502 may include a touchscreen display 504 (e.g., an example of user interface(s) 340). The robotic device 502 may further include a number of charging ports 506 (e.g., the charging ports 360 of FIG. 3). Additionally, the robotic device 502 may include sensor(s) 508 (e.g., one or more of sensor(s) 310 of FIG. 3). The robotic device 502 may include a storage compartment 510. Storage compartment 510 may be utilized to house one or more stored items 512 that may be offered to and/or purchased by a user. In an illustrative, non-limiting example, stored items 512 include a charging cable, an electronic device such as a mobile phone, or a stick of gum. In at least one embodiment, stored items 512 may include one or more items that may be purchased from an electronic marketplace and/or one or more items that may be purchased directly from the charging robot 110. Thus, any suitable item offered for sale or lease may be stored within storage compartment 510, including items that may be purchased/leased from the electronic marketplace. Storage compartment 510 may, in some cases, be locked, requiring the user to enter a code via touchscreen display 504. The robotic device 502 may further include a projector 514 (e.g., an example of display(s) 342 of FIG. 3). Projector 514 may project an electronic advertisement 516 received from charging management system 102 of FIG. 1 in accordance with methods described herein.

Figure 6:
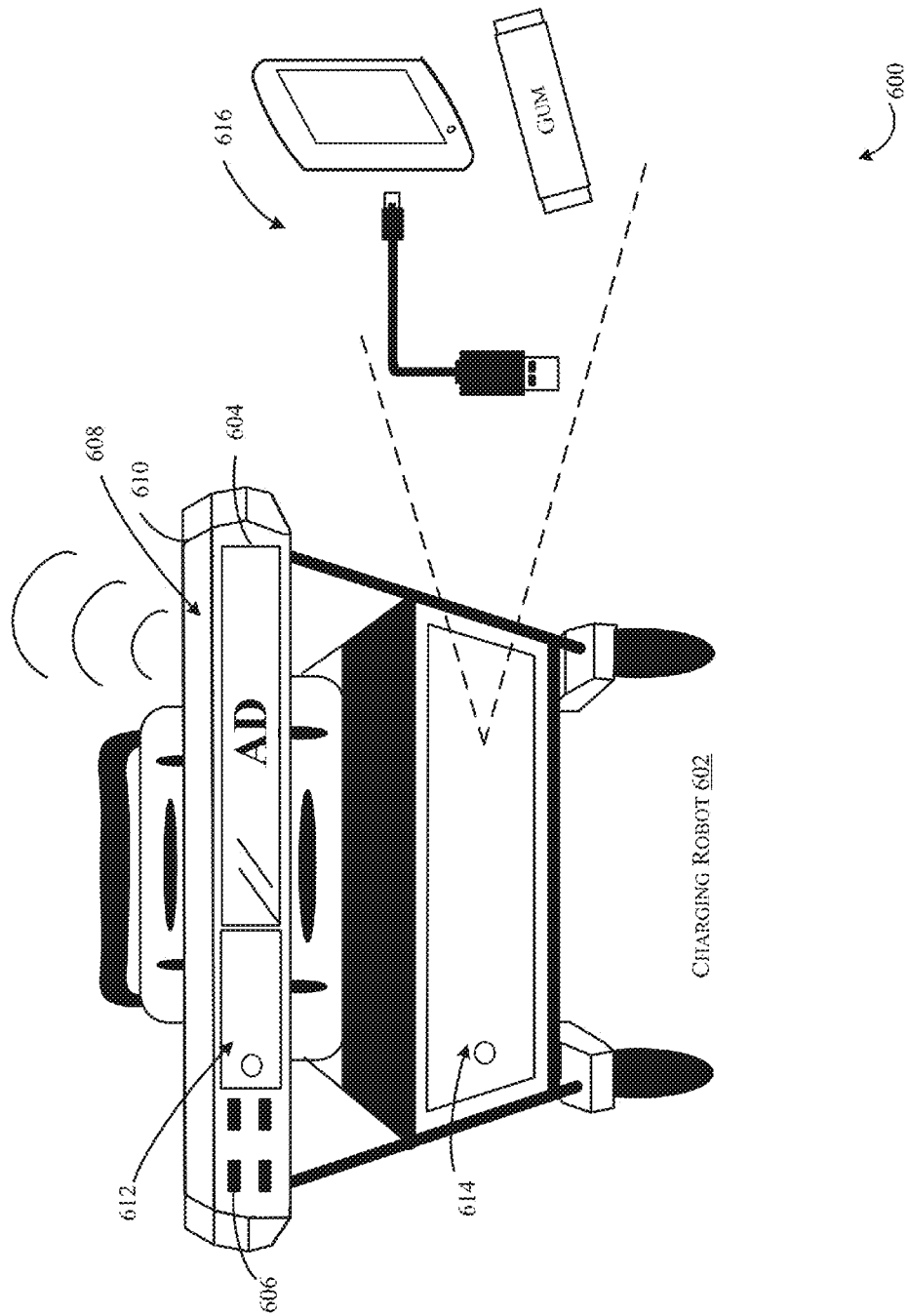
FIG. 6 is a pictorial diagram of another example robotic device, in accordance with at least one embodiment.

FIG. 6 is a pictorial diagram 600 of another example robotic device 602 (e.g., the charging robot 110 of FIG. 1). Robotic device 602 is merely one example of a robotic device capable of being utilized by user 106 or charging management system 102, and thus should not be construed as limiting. It should be noted that the following features depicted in FIG. 6 are not necessarily to scale. In the example depicted in FIG. 6, the robotic device 602 is a luggage trolley robot. A "luggage trolley robot," as used herein, is intended to refer to a luggage trolley fitted with at least one motor (e.g., an actuator) capable of moving the luggage trolley, the motor being controlled by a processor unit (e.g., the processing unit(s) 303 of FIG. 3).

The robotic device 602 may include a touchscreen display 604 (e.g., an example of user interface(s) 340). The robotic device 602 may further include a number of charging ports 606 (e.g., the charging ports 360 of FIG. 3). Additionally, the robotic device 602 may include sensor(s) 608 (e.g., one or more of sensor(s) 310 of FIG. 3) located, in this example, in handle bar 610. The robotic device 602 may include storage compartment 612 and storage compartment 614. The storage compartment 612 may, in some cases, be configured to store a mobile device while charging. In some cases, charging ports 606 may be accessible to the mobile device stored in storage compartment 612. The storage compartment 614 may be utilized to house one or more stored items 616. In an illustrative, non-limiting example, stored items 616 include a charging cable, an electronic device such as a mobile phone, or a stick of gum. Any suitable item offered for sale or lease may be stored within the storage compartment 614. The storage compartment 612 and the storage compartment 614 may, in some cases, be locked, requiring the user to enter a code via touchscreen display 604. It should be appreciated that the storage compartment 612 and the storage compartment 614 are illustrative in nature, and that such storage compartments may exist in other locations on charging robot 602.

Figure 7:
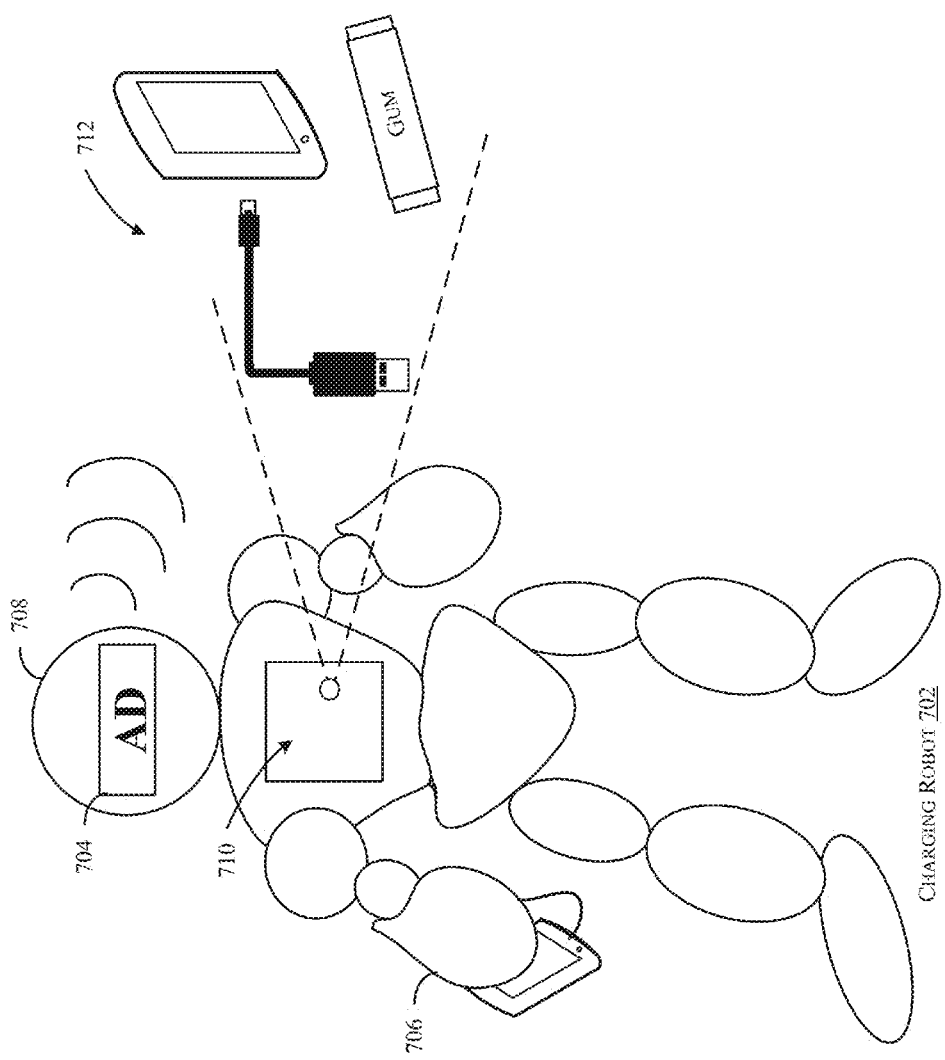
FIG. 7 is a pictorial diagram of yet another example robotic device, in accordance with at least one embodiment.

FIG. 7 is a pictorial diagram 700 of yet another example robotic device 702. The robotic device 702 is merely one example of a robotic device capable of being utilized by the user 106 or charging management system 102, and thus, should not be construed as limiting. It should be noted that the following features depicted in FIG. 7 are not necessarily to scale. In accordance with at least one embodiment, the robotic device 702 includes a variety of features. In the example depicted in FIG. 7, the robotic device 702 is a humanoid robot. A "humanoid robot," as used herein, is intended to refer to is a robot with a body shape built to resemble that of the human body. Typically, humanoid robots rely on bipedal locomotion, though other methods for movement may be utilized. In general, humanoid robots have a torso, a head, two arms, and two legs, though some forms of humanoid robots may model only part of the body, for example, from the waist up. Some humanoid robots may also have heads designed to replicate human facial features such as eyes and mouths.

In accordance with at least one embodiment, the robotic device 702 includes a touchscreen display 704 (e.g., an example of user interface(s) 340). The robotic device 702 may further include a number of charging ports (e.g., the charging ports 360 of FIG. 3) located within hand 706. Additionally, the robotic device 702 may include sensor(s) 708 (e.g., one or more of sensor(s) 310 of FIG. 3) located, in this example, in the head piece of charging robot 702. The robotic device 702 may include a storage compartment 710. Storage compartment 710 may be utilized to house one or more stored items 712. In an illustrative, non-limiting example, stored items 712 include similar items as discussed above in connections to stored items 512 of FIG. 5. Storage compartment 710 may, in some cases, be locked, requiring the user to enter a code via touchscreen display 704. It should be appreciated that storage compartment 710 is illustrative in nature, and that such storage compartments may exist in other locations on charging robot 702.

FIGS. 8-12 illustrate example schematic diagrams and flow diagrams showing processes 800-1200, as described herein. These processes illustrated as schematic diagrams and logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, or the like that perform particular functions or implement particular data types. The order in which the operations are described is not intended to be construed as a limitation, and any number of the described operations can be omitted or combined in any order and/or in parallel to implement the process.

Additionally, the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

Figure 8:
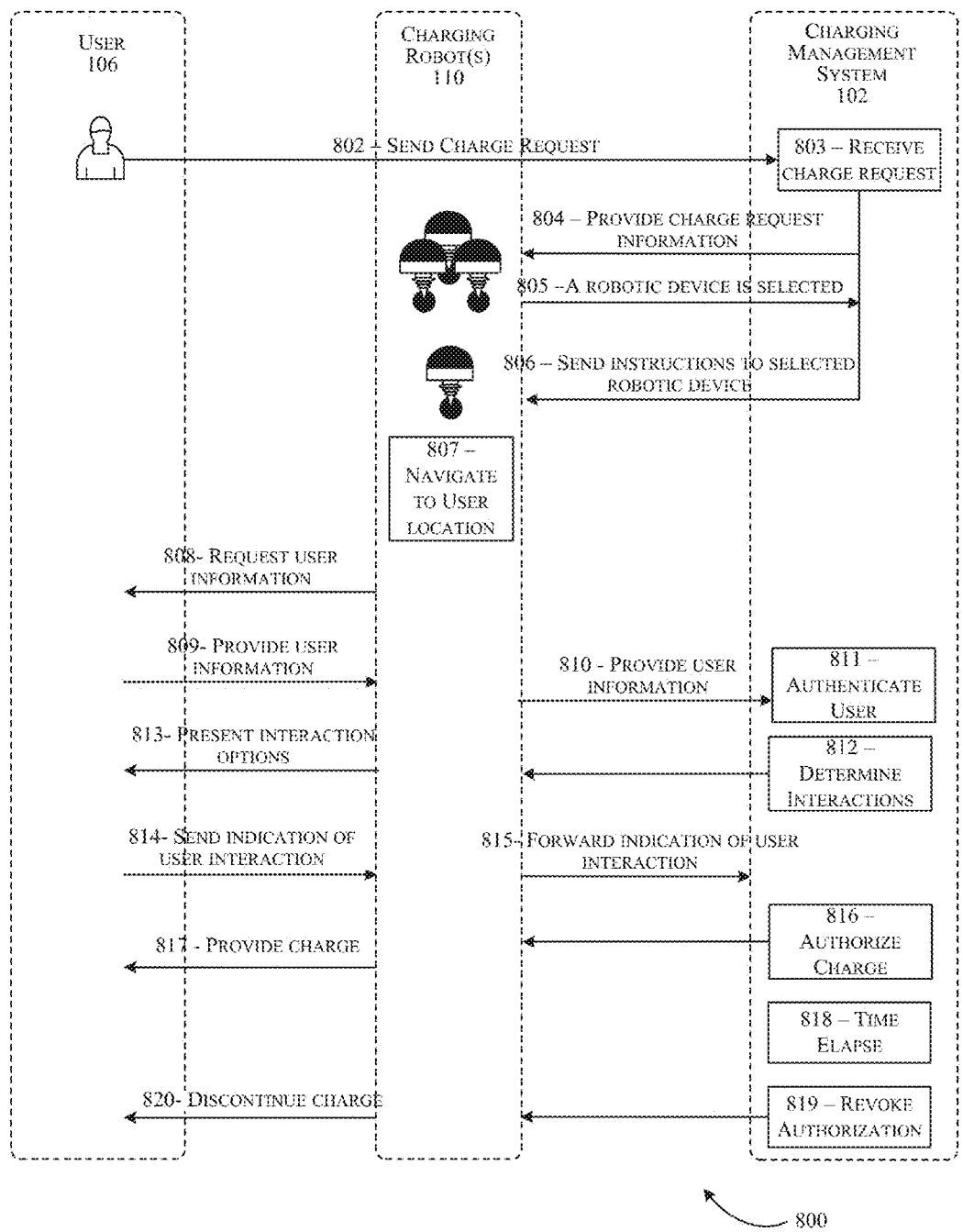
FIG. 8 is a schematic diagram illustrating an example method 800 for providing electronic mobile device charging by a charging management system using a using a robotic device managed by the charging management system, in accordance with at least one embodiment.

FIG. 8 is a schematic diagram illustrating an example method 800 for providing electronic mobile device charging by a charging management system (e.g., by the charging management system 102 of FIGS. 1 and 2) using a using a robotic device (e.g., the charging robot 110 of FIG. 1) managed by the charging management system 102, in accordance with at least one embodiment. FIG. 8 is intended to illustrate a use case in which the charging request information is provided directly to one or more robotic devices, including the charging robot 110, for a particular robotic device to be selected from determinations made collectively by the one or more robotic devices. The method begins at 802, where a user 106 (utilizing a computing device, such as the user computing devices 204 in FIG. 1) a may send a charging request to the charging management system 102. At 803, the charging management system 102 may receive the request. As indicated above, the charging request may include information associated with the user 106 (e.g., user ID, a location associated with the user), an electronic device type, and a time. Information related to the charging request may be sent by charging management system 102 to one or more robotic devices (e.g., the charging robot 110) at 804.

As an illustrative, non-limiting example of the process for selecting a charging robot 110 to handle the charging request, multiple charging robots (including the charging robot 110) may communicate charging capability information to other charging robots on a network. Each charging robot may execute instructions that compare received charging capabilities of another charging robot to the charging capabilities of charging robot 110. For example, charging robot 110 compares its own charging capabilities against charging capabilities of other robots to determine if one or more of the other robots is better suited to fulfilling the charging request than the charging robot 110. As an example, a charging robot (robot A) may be capable of charging an electronic device associated with a charging request to 20% capacity. The robot A may be located a distance that will take approximately five minutes for robot A to reach the user at the user's location. Another charging robot (robot B) may be capable of charging the electronic device associated with the charging request to 100% capacity. Robot B may be located at a distance that would require 2 minutes travel time for robot B to travel to the user's location. Robot A may receive charging capabilities associated with robot B and execute operations that determine 1) that robot B may charge the electronic device to a greater extent than robot A could, and/or 2) that robot B is closer to the user than robot A. Based on such determinations, robot A may execute operations that determine that robot A should not handle the charging request. Similarly, robot B, upon receiving charging capabilities associated with robot A, may execute operations that determine that robot B is best suited to fulfill the charging request due to 1) a determination that robot B is able to charge the electronic device to a greater extent than robot A, and/or 2) a determination that robot B is closer to the user than robot A. The determinations discussed above may be based, at least in part, on one or more rules associated with charging capabilities of various robots, locational rules, configuration specification of various robots, or the like. At 805, robot B, upon a determination that it is the best suited charging robot to complete the charging request, may execute operations that communicate to the charging management system 102 that robot B will fulfill the charging request.

As a further non-limiting example, upon receipt of the charging request, each charging robot 110 may transmit its location to the other charging robots. Upon receipt of a transmitted location, a charging robot (e.g., the charging robot 110) may compare its location to the received location. If the charging robot 110 ascertains that it is closer to the user 106 than the received location it may self-assign itself to carry out the charging request. In at least one example, after a period of time has elapsed during which no additional locations are received, the charging robot 110 may send information related to its identification to the charging management system 102 at 805 indicating that the charging robot 110 has been selected to fulfill the charging request.

At 806, the charging management system 102 may send instructions to the identified charging robot 110 to carry out the charging request utilizing, for example, robot coordination manager 422 of the charging management engine 210 may send instructions to dispatch the charging robot 110 to a user. In at least one example, robot coordination manager 422 may delay dispatching the charging robot 110 based on a number of other charging requests. This may be the case when there is no available charging robot available (e.g., all charging robots are busy fulfilling other charging requests). Additionally, or alternatively, robot coordination manager 422 may delay dispatching the charging robot 110 based on a prioritization scheme associated with the charging requests. For example, a user that requesting 60 minutes of charging time may have a charging robot dispatched at an earlier time than a user who made a charging request at substantially the same time but who requesting only 20 minutes of charging time. The user requesting the longer charging time may be provided faster service given an assumption that the user will exchange more value (monetary or via participating in user activities) than the user requesting a shorter charging time. In some cases, for example, when there is high demand for the charging robots, users requesting shorter charging times may be given priority so as to provide more users access to the charging robots. The prioritization scheme utilized by the charging management system 102 may take into account various factors that are identifiable from information included in the charging request including, but not limited to, a duration of charging time, a type of electronic device to be charged, purchase information regarding an item (good or service), to name a few. Such instructions may additionally include information related to the user's location (e.g., in the event that the user has moved since issuing the request).

At 807, the robotic device may navigate to the user's location as indicated in the instructions at 806. Once in the user's presence, the charging robot 110 may request user information at 808. For example, charging robot 110 may present, via a user interface provided by display manager 428 of the charging management engine 210, a request for the user to enter login information associated with an electronic marketplace account. As previously discussed, login information may be utilized to obtain user profile information (e.g., past purchase information, return history, browsing history, etc.) in order to determine one or more user activity options to present to the user. Additionally, the obtained user profile information may be used to access billing and/or shipping information of the user. In at least one example, the user may enter such login information at the user interface. In some examples, the charging robot 110 may collect user information (e.g., biometric information to be used for login purposes) using an imaging device or RFID. Login information may also be utilized to authenticate the user and confirm that the charging robot 110 has arrived at and is being utilized by the user who initiated the charging request. Charging robot 110 may forward such user information to the charging management system 102 at 810. At 811, the charging management system 102 may authenticate the user using the forwarded user information. In at least one example, image recognition techniques or audio recognition techniques may be utilized to authenticate the user.

At 812, charging management system 102 may determine one or more user activity options to present to the user, utilizing, for example, the user login information and/or the user information collected using an imaging device or RFID described above. The content selection engine 420 of the charging management engine 210 may obtain user profile information (e.g., from user profile data store 406) using the user login information and/or user information collected using an imaging device or RFID. In one non-limiting example, the content selection engine 420 may utilize the obtained user profile information to ascertain past purchase information associated with the user in order to determine one or more user activity options (e.g., an option to view an advertisement) to present to the user via the robot. Information related to the determined user activity options (e.g., the one or more advertisements from the example above) may be sent to the charging robot 110. At 813, charging robot 110 may present the user activity options using display manager 428 of the charging management engine 210. At 814, the user 106 may cause an indication of user interaction to be sent to the charging robot 110. As a non-limiting example, the user 106 may select a user activity option (e.g., by selecting a displayed hyperlink, clicking a graphical or physical button, touching a touch screen, speaking out load, or the like). As a result of the user's selection, information about the user's selection may be sent to charging robot 110. For example, consider the option selected was to browse an electronic marketplace via an interface provided on the charging robot 110. In this example, the user's browsing activity may cause the indication of user interaction at 814. Other examples of indications of user interactions include button clicks, keyword search activity, completion of a purchase, plugging an electronic device into a charging port of the charging robot 110, or the like.

In at least one example, the charging robot 110 may use one or more of sensor(s) 310 to ascertain that the user is interacting in the appropriate manner according to the user activity being conducted. In such an example, user interactions include movements of the user (e.g., an eye movement, a hand wave, a head movement, etc.). For example, if the user is required to view a video in exchange for his charging time, an imaging device on charging robot 110 may be utilized to "watch" the eye movements of user. Facial recognition and/or image processing techniques may be utilized to determine that the user is, in fact, watching the video (e.g., based on an estimated viewing angle of the user with respect to the robotic device, a threshold number of eye movements over a period of time, movement of suitable portion of the user, etc.). In yet other embodiments, facial recognition and or/image processing techniques (or other biometric data) may be utilized to authenticate the user and confirm that the charging robot arrived at and/or is being utilized by the intended user. In at least one example, sensor(s) 310 may be used to collect interaction data indicating a user interaction with the robotic device (e.g., movement by the user, proximity of the user with respect to the robotic device, or the like.). Such a determination would also send the indication of user interaction discussed above. The charging robot 110 may forward the indication of user interaction to the charging management system 102 at 815.

As a non-limiting example, upon user selection of the user activity option (e.g., an option to view an advertisement), charging management system 102 may select one or more advertisements (e.g., from advertisement data store 414 of FIG. 4) to be presented to the user based on, for example, a relevancy score between the past purchase information and the advertisement. Charging management engine 102 may assign a relevancy score to advertisements of the advertisement data store 414 based on a comparison between an item featured in the advertisement and one or more items that have been purchased by the user. As a non-limiting example, an advertisement featuring a toy for children may be assigned a higher relevancy score than an advertisement featuring a piece of jewelry due to the past purchase information indicating that the user has purchased children's toys more often than purchasing jewelry. A relevancy score may be based on a comparison of item features/details (e.g., a featured electronic item in an advertisement having a similar feature, for example, an high definition feature, as an electronic item previously purchased by the user on an electronic marketplace). A relevancy score may be based on comparison of an item category (e.g., the featured item being associated with a same, or similar, category as a category, for example "housewares," from which the user has purchased items in the past). Any suitable user profile information may be utilized to determine relevancy scores including, but not limited to, browsing information of the user, return history of the user, user-specified preferences associated with preferred advertisement categories, or the like.

Upon receipt of the indication of user activity (e.g., the user submits payment information, the user completes a survey, the user views an advertisement, or completion of any user activity provided in exchange for charging an electronic device from the power source(s) 370 of the charging robot 110, etc.) charging management system 102 may authorize the charge of the electronic device at 816. In at least one example, the authorization indicates to the charging robot 110 a period during which the user is authorized to charge the electronic device. Any suitable charging period may be authorized and, in some cases, may depend on the user activity, the user interaction, the number of users currently requesting a charge, and other relevant considerations.

For example, particular user activities may receive more or less charging time than other user activities. For example, a user who purchases/leases an item from an electronic marketplace, or alternatively, from the charging robot 110, may receive more authorized charging time (e.g., 30 minutes of charging time) than a user who completed a user activity of watching a number of advertisements using the charging robot 110 (e.g., 10 minutes of charging time). Purchasing a stick of gum from the charging robot may result in less charging time than, for example, purchasing a charging device from the charging robot 110. In accordance with at least one embodiment, charging time may be based on a monetary purchase threshold (e.g., 30 minutes of charging time for purchasing an item for a price greater or equal to $2.00, 45 minutes of charging time for purchasing an item priced greater or equal to $5.00, etc.). Items may be purchased/leased from an electronic marketplace and delivered by the charging robot 110 or items may be purchased/leased directly from the charging robot 110. The amount of charging time allotted may be additionally, or alternatively, based on an amount of time that it takes the user, or an assumed amount of time that it will take the user, to complete a user activity. For example, charging time may be given on charging robot 110 for as long as the user continues to interact with the charging robot 110 (e.g., while using a user interface on charging robot 110 to browse an electronic marketplace). In some examples, charging time may be allotted only on completion of a user activity (e.g., completion of a survey) or based on a predetermined allotment of time (e.g., 30 minutes has been predetermined to be allotted upon completion of a human intelligence task such as identifying text in a picture). In at least one example, the user may simply pay a predetermined fee in exchange for a period of charging time (e.g., 30 minutes of charging time for $5.00). The fee may vary depending on the period of charging time purchased. Such payments may be processed by submission of payment information at a user interface of the charging robot 110. Payment information may be transmitted to payment engine 426 of the charging management engine 210. Upon completion of payment, the charging management system 102 may authorize the charging robot 110 to provide the charge to the electronic device of the user causing the charging robot 110 to provide the charge to the electronic device at 817. Fee payment(s) may be conducted at an electronic marketplace (e.g., a user buys 60 minutes of charging time to user now or at a later date). Charging time may, in some cases, be discounted as the amount of purchased charging time increases (e.g., $2.00 for 10 minutes, $5.00 for 30 minutes, $7.00 for 60 minutes, etc.).

In at least one example, while the charging robot 110 is charging the device, the user may utilize the user interfaces of the charging robot 110 to peruse an electronic marketplace, to view items stored on the charging robot 110 that are available for purchase, to view advertisements, to play a game, to access electronic content (e.g., music, movies, and television), or the like. The charging robot 110 may display a percentage of charge, and/or charge time remaining to charge the electronic device. The user, in some cases, may be provided the option to purchase rapid charging time. For example, a user may purchase or otherwise exchange user interaction for charging time using a 2-amp capable charger. The user may additionally, or alternatively, choose to purchase, or otherwise exchange user interaction for charging time using a 5-amp capable charger. The 5-amp capable charger may charge the electronic device at a faster rate than the 2-amp capable charger and, in some cases, may be purchased and/or exchanged for more monetary or user activity value than the 2-amp capable charger. In at least one embodiment, the charging robot 110 may throttle, or otherwise control, the electrical current used by a charging port(s) 360 of the charging robot 110 so as to control the rate of electrical current flowing to the electronic device. At 818, in accordance with at least one embodiment, the charging management system 102 may determine (e.g., utilizing clock 375 of FIG. 3) that the authorized period has passed. Based on such a determination, the charging management system 102 may revoke charging authorization at 819 causing, at 820, the charging robot 110 to discontinue charging the electronic device. In at least one example, charging robot 110 may take a remedial action upon receipt of the authorization revocation. For example, charging robot 110 may alert the user 106, either audibly or visually that charging has ceased. Additionally, or alternatively, the charging robot 110 may physically detach the electronic device upon receiving authorization revocation. The charging robot 110, in some cases, may discontinue the charging of the electronic device, with or without an alert to the user.

Figure 9:
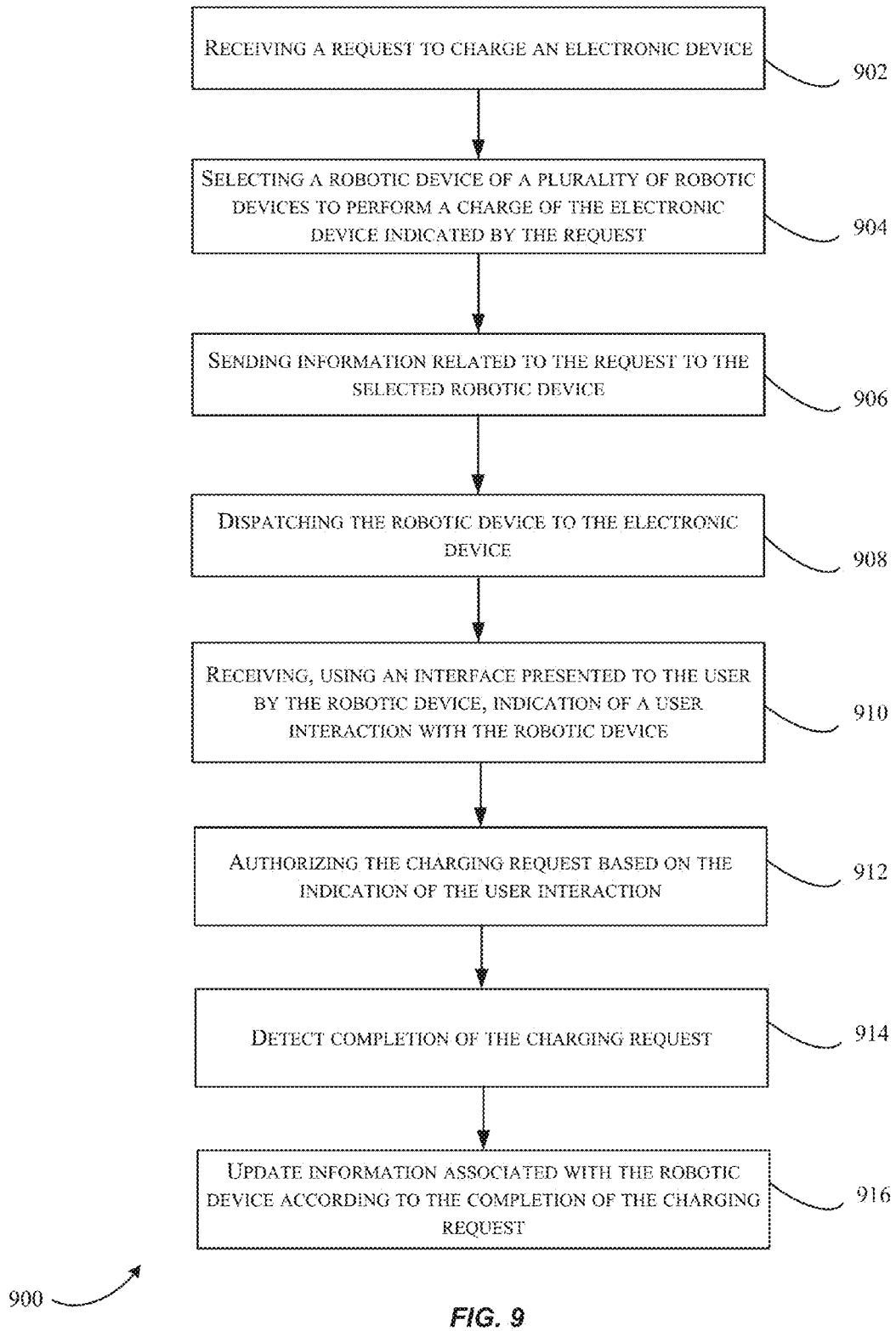
FIG. 9 is a flowchart illustrating another example method by which the charging management system interacts with a robotic device to providing charging to an electronic mobile device, in accordance with at least one embodiment.

FIG. 9 is a flow chart illustrating another example method 900 for providing electronic mobile device charging by a charging management system (e.g., the charging management system 102 of FIGS. 1 and 2) using a robotic device (e.g., the charging robot 110 of FIG. 1), in accordance with at least one embodiment. FIG. 9 is intended to illustrate a use case in which the charging management system 102 determines a particular charging robot (e.g., the charging robot of 110) from a group of charging robots. The method may begin at block 902 where a request to charge an electronic device is received by the charging management system 102 from a user computing devices 204 utilized by the user.

At block 904, a particular charging robot (e.g., the charging robot 110 of FIG. 1) of a number of charging robots may be selected by the charging management system 102 to perform a charge of the electronic device indicated in the request (e.g., a subset of known operational charging robots). As an illustrative, non-limiting example, multiple charging robots may communicate charging capability information to the charging management system 102. Such information may be stored by, for example, the robot coordination manager 422 of FIG. 4. A component of the charging management system 102 (e.g., the robot coordination manager 422) may compare received charging capabilities of the various charging robots to determine a particular charging robot to assign the charging request. These comparisons may be used to determine, for example, an best suited charging robot for completing the charging request. As an example, the charging robot 110 (robot A for this example) may be capable of charging an electronic device associated with a charging request to 20% capacity. The robot A may be located a distance that will take approximately five minutes for robot A to reach the user at the user's location (e.g., included in the charging request). Another charging robot (robot B) may be capable of charging the electronic device associated with the charging request to 100% capacity. Additionally, robot B may be located at a distance that would require 2 minutes travel time for robot B to travel to the user's location. The charging management system 102 may score, or otherwise assess, the capabilities of robot A and robot B. Scores may be calculated based on, a charging configuration of each charging robot (e.g., what charging port(s) are available on the charging robot), a charging rate (e.g., a 2-amp charging capability) of the charging robot, a location of the charging robot, a location of the user, an electronic device to be charged, an inventory located on or accessible to the charging robot, a location of inventory accessible to the charging robot, a remaining charge on the charging robot, a location of a charging station where the charging robot may recharge itself, a specification of the space the user and/or the charging robot (e.g., a map of an airport at which the user and the charging robot are currently located), or the like. The determinations discussed above may be based on one or more rules associated with charging capabilities of various robots, locational rules, configuration specification of various robots, or the like.

At block 906, information related to the request may be sent to the selected charging robot in order to dispatch the selected charging robot to the user's location. At block 908, after selection of a robotic device as described above, a robotic device (e.g., the selected robotic device) may be dispatched. At block 910, an indication of a user interaction with the charging robot 110 may be received (e.g., utilizing an interface presented to the user by the robotic device). The indication of user interaction with the robot B may include any example discuss herein, including completing a survey, viewing an advertisement, accessing electronic content, playing a game, or the like. While the charging robot 110 is charging the device, the user may utilize the user interfaces of the charging robot 110 to peruse an electronic marketplace, to view items stored on the charging robot 110 that are available for purchase, to view advertisements, to play a game, to access electronic content (e.g., music, movies, and television), or the like. At block 912, the charging request may be authorized based on the indication of the user interaction.

At block 914, the charging management system 102 may detect completion of the charging request. In at least one example, detection may constitute an alarm or other indication of time elapse (e.g., the user was allotted 30 minutes and the charging management system 102 has detected that 30 minutes have elapsed). Detection may additionally, or alternatively, constitute receipt of an indication of completion of the charging request from robot B. Upon detection of completion of the charging request, the charging management system 102 may communicate instructions to the charging robot that cause the charging robot to cease charging of the electronic device. Additionally, the charging management system 102 may communicate instructions that cause the charging robot to alert the user of the completion of the charging request and/or to provide the user with an option to continue charging (e.g., in exchange for a fee or completion of a user activity).

At block 916, the charging management system 102 may update information (e.g., robot availability, charging capabilities, location, etc.) associated with the robotic device according to the completion of the charging request. In some cases, for example, if the robotic device is below a predetermined battery level threshold, the charging management system 102 may communicate instructions to the robotic device that cause the robotic device to seek charging of its internal power sources (e.g., power source(s) 370 of FIG. 3).

Figure 10:
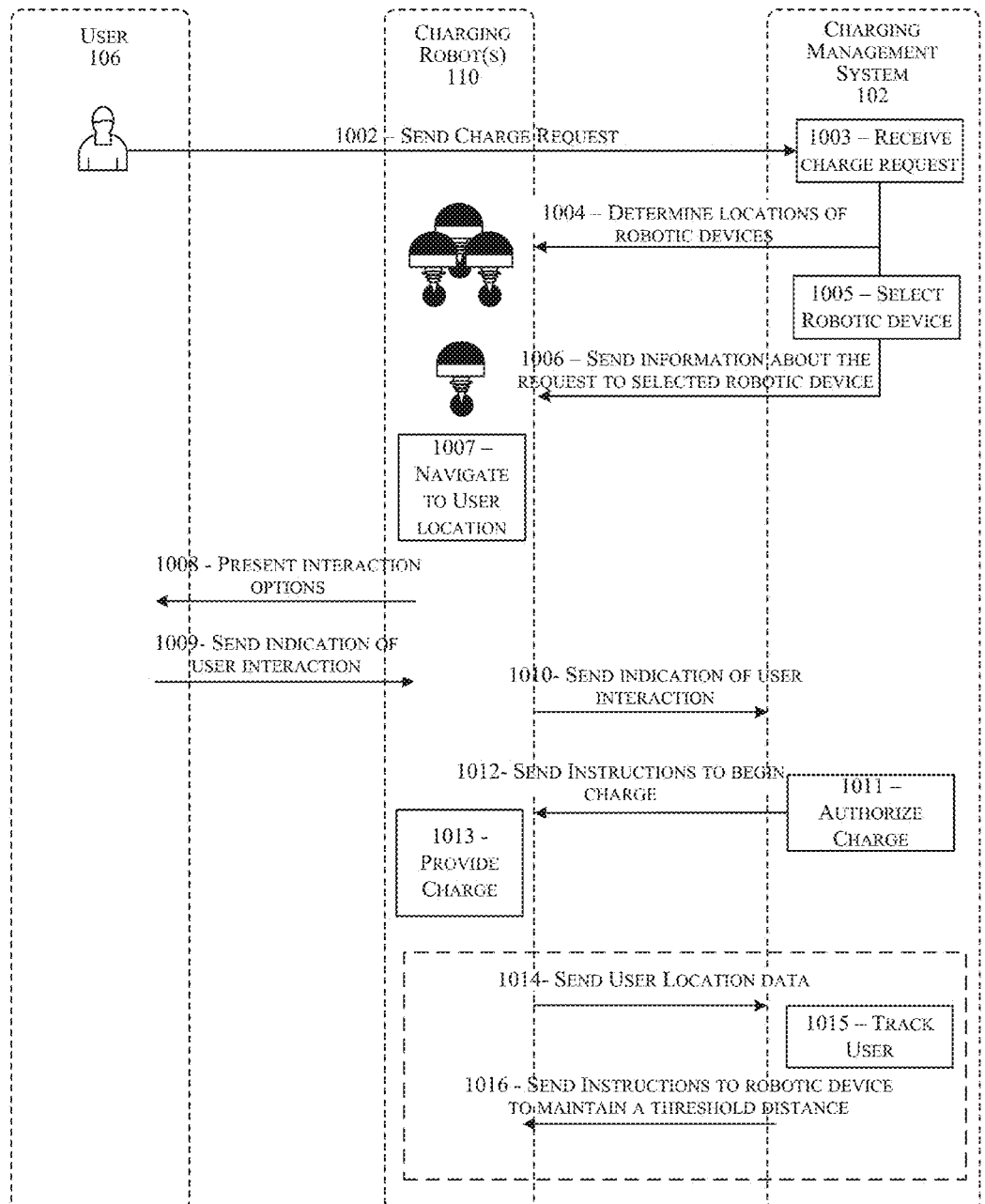
FIG. 10 is a schematic diagram illustrating yet another example method for providing electronic mobile device charging by a charging management system using a robotic device, in accordance with at least one embodiment.

FIG. 10 is a schematic diagram illustrating yet another example method 1000 for providing electronic mobile device charging by a charging management system (e.g., the charging management system 102 of FIG. 1 and FIG. 2) using a robotic device (e.g., charging robot 110 of FIG. 1), in accordance with at least one embodiment. FIG. 10 is intended to illustrate a use case in which the charging management system 102 determines a particular charging robot (e.g., the charging robot of 110) from a group of charging robots based on location. The method 1000 may begin at block 1002, where a user 106 sends a charging request to the charging management system 102. At 1003, the charging management system 102 receives the request (e.g., via application programming interface 418 and charging request manager 424 of FIG. 4). As indicated above, the charging request may include information associated with the user 106 (e.g., user login information, a location associated with the user), an electronic device type, and a time. Such information associate with the user may be used to access user information including, but not limited to, billing and/or shipping information, past purchase information, return history, etc. The information associated with the user may be used to authenticate the user.

In accordance with at least one embodiment, the charging management system 102 determines one or more locations of one or more charging robot 110 at 1004. For example, the charging management system 102 sends a request to a subset of the charging robots requesting available devices to respond. Additionally, or alternatively, the charging management system 102 consults, for example, a mapping indicating available charging robots. Further, charging management system 102 may determine the subset based on which charging robots are capable of charging an electronic device of the type indicated in the charging request. "Capable", as used herein, is intended to mean that the charging robot is operational, the charging robot has a charging configuration that is enabled to charge electronic devices of the same type as the electronic device, the charging robot is not otherwise occupied (e.g., already charging an electronic device or otherwise being used), the charging robot has over a threshold amount of battery power remaining, and in some cases, the charging robot is within a threshold distance of the user, or any combination above. At 1005, charging management system 102 may select a charging robot to carry out the charging request, in this case, by determining a charging robot nearest to the user's location. At 1006, charging management system 102 may send information about the charging request to the selected charging robot utilizing, for example, the robot coordination manager 422 of FIG. 4.

At 1007, after being dispatched by the charging management system 102, the charging robot 110 may navigate to the user's location as indicated in the instructions at 806. Once in the user's presence, the charging robot 110 may provide user 106 (e.g., according to instructions received and/or determined by display manager 428 of FIG. 4) a number of user activity options (e.g., determined by content selection engine 420 of FIG. 4) at 1008. At 1009, user 106 may cause an indication of user interaction (e.g., a button-click, selection, or other interface element selection) to be sent to the charging robot 110 in a similar manner as described above in connection with FIG. 8. The charging robot 110 may send the indication of user interaction to charging management system 102 at 1010.

Upon receipt of the indication of user interaction, charging management system 102 may authorize the charge at 1012. In at least one example, the authorization indicates to the charging robot 110 a period of time during which the user is authorized to charge the electronic device. As discussed above, any suitable period of time may be authorized and, in some cases, may depend on the type of user activity, a number of users currently requesting a charge, and other considerations. In at least one example, if a number of charging requests exceeds a threshold amount (e.g., indicating that X number of users are waiting) charging times allowed may be decreased for one or more users to increase charging robot availability. Alternatively, the number of charging requests may be ignored, and any suitable charging period of time may be allowed to users completing particular user activities. As a non-limiting example, a user who pays for the charging time may not have his time decreased (e.g., as a result of high charging time demand), while a user who is viewing an advertisement in exchange for charging time may have his time decreased (e.g., as a result of high charging time demand). As previously mentioned, completion of some user activities result in more or less charging time than other completion of other user activities. The charging robot 110 may commence charging the electronic device at 1013.

In accordance with at least one embodiment, the charging robot 110 "follows" the user while charging the electronic device. Consider the case where the user 106 has purchased a period of charging time and is shopping (e.g., in a shopping center). Once charging commences, the charging robot 110 may utilize any suitable combination of sensor(s) 310 to determine that the user 106 is moving. Such data may be sent to charging management system 102 at 1014. Upon receipt of such data, charging management system 102 (e.g., the tracking manager 430 of FIG. 4) may, for example, utilize a map (e.g., digital floor plans of the shopping center obtained from map data store 408 of FIG. 4) and/or sensor data indicating obstacles between the charging robot and the user. The charging management system 102 may utilize the map and the sensor data to track the user through the shopping center. As the charging management system 102 tracks the user 106 through the shopping center, instructions may be sent periodically to charging robot 110 indicating instructions to maintain a threshold distance between the charging robot 110 and user 106. Such instructions may include operations that cause the charging robot 110 to increase or decrease speed, to change or maintain a heading, or the like. Such instructions may be based on sensor data and the map. This tracking process may continue until the user stops moving, until the electronic device is disconnected from charging robot 110, upon user specification, or at any suitable time.

Figure 11:
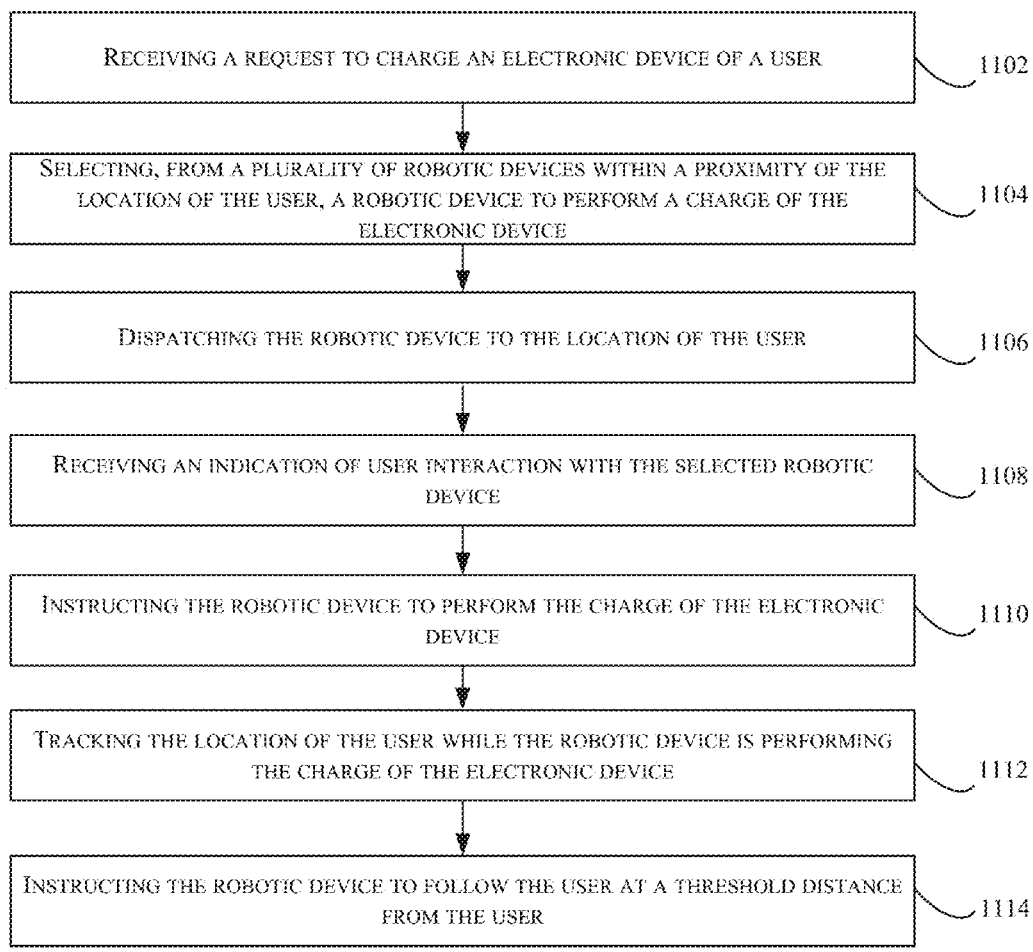
FIG. 11 is a block diagram illustrating still one further example method for providing electronic mobile device charging by a charging management system using a robotic device, in accordance with at least one embodiment.

FIG. 11 is a block diagram illustrating still one further example method 1100 for providing electronic mobile device charging by a charging management system (e.g., the charging management system 102 of FIG. 1 and FIG. 2) using a robotic device (e.g., charging robot 110), in accordance with at least one embodiment. FIG. 11 is intended to illustrate a use case in which the charging management system 102 provides instructions to the robotic device to maintain a threshold distance with respect to the user. The method may begin at block 1102, where a request charge an electronic device may be received. In at least one example, the request may be received from the user utilizing a client application (e.g., the client application 206 of FIG. 2) running on the electronic device. In another example, a request may be sent automatically by an application running on the electronic device, the request being initiated, for example, in response to a determination by the application that the battery power of the electronic device is below a threshold value (e.g., under 10% remaining) The request may indicate a location of the user. In yet another example, the request may indicate that the robotic device is to provide the user with an item (e.g., stored on the robotic device).

At block 1104, a robotic device may be selected to perform a charge of the electronic device, the robotic device being selected from a plurality of robotic devices within a proximity of the location of the user. For example, robotic devices located within a proximity of the location of the user may be determined by utilizing location information of each of the robotic devices (e.g., using GPS coordinates, map data, or the like) and the location of the user (e.g., using GPS coordinates, map data, or the like). In accordance with at least one embodiment, information related to the request may be sent to one or more robotic devices of the plurality of robotic devices within a proximity of the location of the user. For example, robotic devices that are located within the proximity of the location of the user may first be identified. The request may then be sent only to those identified robotic devices. As discussed above, the robotic devices may communicate with one another to determine a best suited robotic device for fulfilling the charging robot. The selected device may communicate the self-assignment to the charging management system 102. Alternatively, the charging management system 102 may select the robotic device to perform the charge by utilizing information including, but not limited to location data of the robotic device and the user and capability information of the robotic devices.

At block 1106, the robotic device may be dispatched to the location of the user. For example, charging management system 102 may send instructions to the robotic device that, when executed, cause the robotic device to travel to the user. In another example, charging management system 102 may provide a location of the user and the robotic device may calculate a traversal path to the user.

At block 1108, an indication of user interaction with the selected robotic device is received (e.g., by the charging management system 102). As discussed above, the indication of user interaction may include, but is not limited to, button clicks, keyword search activity, completion of a purchase or lease, sensor data, to name a few.

At block 1110, instructions are sent to the selected robotic device (e.g., by the charging management system 102). The instructions, when executed, cause the charging of the electronic device to commence, the instructions may be sent based on the received indication of user interaction.

At block 1116, the location of the user is tracked while the robotic device is performing the charge of the electronic device. For example, sensor(s) 310 on the robotic device, map data, video feed (e.g., provided by a source other than the robotic device), or any suitable combination of the above, may be utilized to track the location of the user as described in the examples above.

At block 1114, the robotic device may be instructed to follow the user at a threshold distance from the user. For example, charging management system 102 may transmit instructions to the robotic device that, when executed, cause the robotic device to follow the user at a threshold distance from the user. In another example, charging management system 102 may provide periodic location updates with respect to the user and the robotic device may calculate a traversal path each location update.

Figure 12:
FIG. 12 is a block diagram illustrating an example method for leasing an electronic device by a user using a charging management system and a robotic device, in accordance with at least one embodiment.

FIG. 12 is a block diagram illustrating an example method 1200 for leasing an electronic device by a user using a charging management system (e.g., the charging management system 102) and a robotic device, in accordance with at least one embodiment. FIG. 12 is intended to illustrate a use case in which the user may lease an electronic device at one location and return the electronic device at another location. The flow may begin at 1202 where a request to lease an electronic device is received by the charging management system 102 from a user at a first location (e.g., a departure airport). In at least one example, the request to lease may pertain to an electronic device (e.g., a tablet PC preloaded with one or more movies).

At block 1204, information related to the request may be sent by the charging management system 102 to one or more robotic devices of a plurality of robotic devices at the first location (e.g., the departure airport). At 1206, an indication of a user interaction with a first robotic device of a plurality of robotic devices may be received by the charging management system 102. Such an indication may be received using an interface presented to the user by the first robotic device.

At block 1208, instructions for the first robotic device to provide the electronic device (e.g., the preloaded tablet PC) to the user may be sent by the charging management system 102. At block 1210, a request to return the electronic device provided by the first robotic device may be received by the charging management system 102 from the user (e.g., the user's electronic device) at a second location (e.g., an arrival airport). In at least one example, the request to return the electronic device may be sent from the electronic device or another electronic device. At block 1212, information related to the return request may be sent by the charging management system 102 to one or more robotic devices of a plurality of robotic devices available at the second location (e.g., the arrival airport).

At block 1214, instructions may be provided to the user (e.g., via a user interface presented on a second robotic device) to return the electronic device to the second robotic device. At block 1216, an indication may be received from the second robot indicating that the electronic device has been returned.

Figure 13:
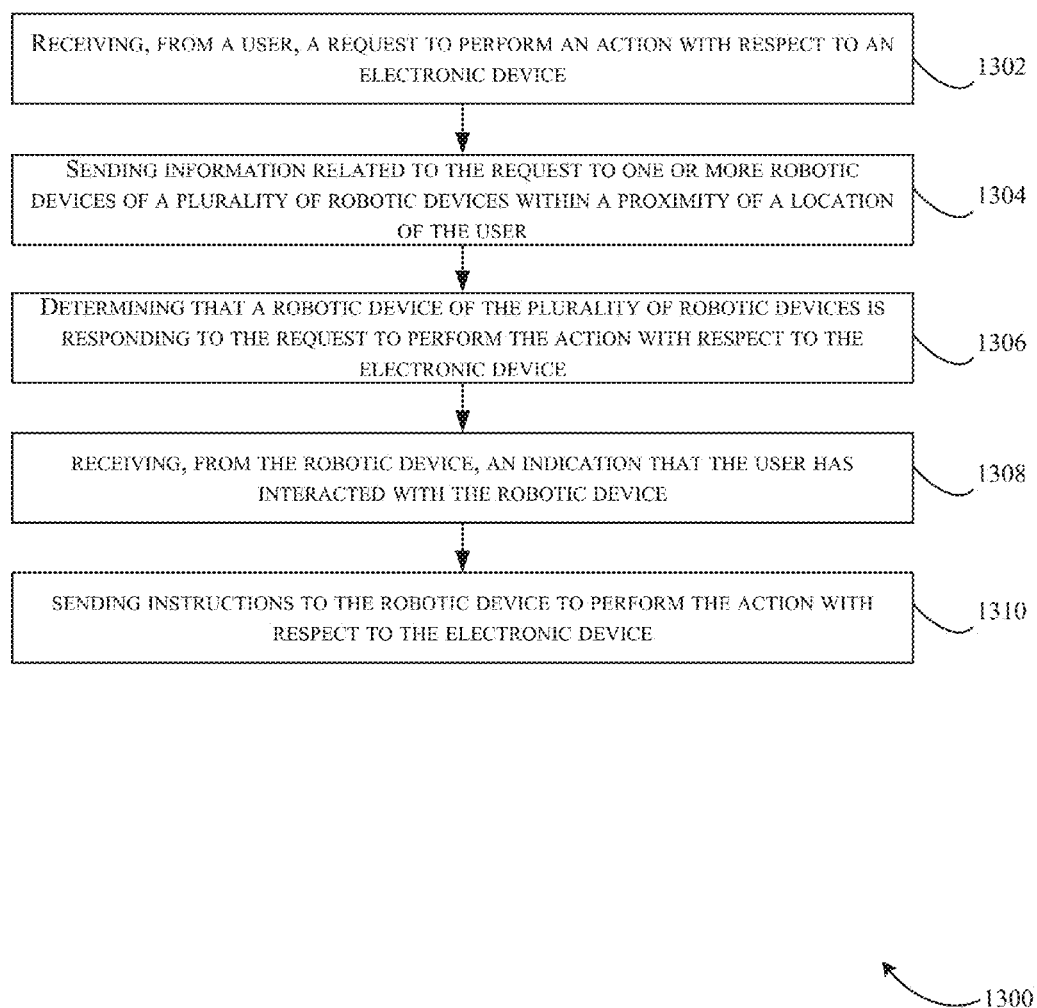
FIG. 13 is a block diagram illustrating an example method for performing an action with respect to an electronic device, in accordance with at least one embodiment.

FIG. 13 is a block diagram illustrating an example method 1300 for performing an action with respect to an electronic device by a charging management system (e.g., the charging management system 102) using a robotic device, in accordance with at least one embodiment.

At block 1302, a request to perform an action (e.g., charging of an electronic device) may be received. At block 1304, information related to the request may be sent to one or more robotic devices of a plurality of robotic devices. In at least one example the one or more robotic devices may be within a proximity of a location of the user (e.g., within 300 yards).

At block 1306, a robotic device of the plurality of robotic devices is determined to be responding to the request to perform the action with respect to the electronic device. For example, a charging robot (e.g., the charging robot 110 of FIG. 1) may transmit information indicating that the charging robot 110 is responding to the request. In another example, the charging management system 102 may determine the charging robot 110 is responding to the request based on (e.g., based on GPS information indicating that the charging robot 110 is traveling to the user and/or that the charging robot 110 is within a threshold distance of the user).

At block 1308, an indication that the user has interacted with the robotic device is received. At block 1310, instructions to perform the action with respect to the electronic device are sent to the robotic device (e.g., the charging robot 110).

Examples included in the present disclosure have included electronic charging examples. It should be noted that the charging management system 102 described herein may provide services other than electronic charging. For example, the charging management system 102, in a similar manner as described in connection to the figures above, may provide additional, or alternative services such as any combination of the following: software updates, virus scanning, content downloads, video game playing (e.g., utilizing the display/interfaces of the robot and/or utilizing the robot as an opponent), item retrieval (e.g., luggage retrieval), storage space (e.g., locked and/or unlocked), item transport (e.g., luggage carrying), handicap assistance (e.g., attaching to and pulling a wheelchair to a designated location), travel information (e.g., flight times, tourism information, etc.), or the like.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response requests from user devices, such as by executing one or more network applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the embodiments as set forth in the claims.

In the description above, various embodiments of the present disclosure have been described. For purposes of explanation, specific configurations and details have been set forth in order to provide a thorough understanding of the embodiments. However, it will also be apparent to one skilled in the art that the embodiments may be practiced without the specific details. Furthermore, well-known features may have been omitted or simplified in order not to obscure the embodiment being described.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

Some or all of the process described above may be performed under the control of one or more computer systems configured with specific computer-executable instructions and may be implemented as code (e.g., executable instructions, one or more computer programs or one or more applications) executing collectively on one or more processors, by hardware or combinations thereof. The code may be stored on a non-transitory computer-readable storage medium, for example, in the form of a computer program including a plurality of instructions executable by one or more processors. The computer-readable storage medium may be non-transitory.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the embodiments to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
   receiving a request to charge an electronic device;
   in response to receiving the request, selecting a robotic device from a plurality of robotic devices to perform charging of the electronic device;
   sending information related to the request to the robotic device;
   dispatching the robotic device to the electronic device;
   receiving an indication from the robotic device of a user interaction with the robotic device; and
   in response to the receiving of the indication of the user interaction with the robotic device, authorizing charging of the electronic device.

2. The computer-implemented method of claim 1, further comprising:
   receiving a plurality of requests, each request of the plurality of requests to charge a different electronic device; and delaying the dispatch of the robotic device based at least in part on the plurality of requests.

3. The computer-implemented method of claim 1, further comprising:
sending, to the plurality of robotic devices, a capabilities information request;
receiving capabilities information related to at least one robotic device of the plurality of robotic devices in response to the capabilities information request; and
determining a particular robotic device of the plurality of robotic devices to dispatch based at least in part on the received capabilities information.

4. The computer-implemented method of claim 1, wherein the received indication from the robotic device of the user interaction indicates that the user is conducting at least one user activity with the robotic device, wherein the at least one user activity includes at least one of viewing an advertisement presented by the robotic device, purchasing an item provided by the robotic device, purchasing an item from an electronic marketplace associated with a provider of the robotic device, participating in a crowd source activity, participating in a survey, participating in a video game, charging the electronic device, or paying a fee.

5. An electronic device charging management system comprising:
a plurality of robotic devices, wherein each robotic device of the plurality of robotic devices includes:
a power source for charging electronic devices,
a user interface that enables user interaction with the robotic device,
a communication interface that communicates data via a network, and
a processing unit in communication with the power source, the user interface, and the communication interface; and
a computing system in communication with each robotic device of the plurality of robotic devices via the network, the computing system configured to at least:
receive a request to charge an electronic device;
broadcast, via the network to the plurality of robotic devices, information related to the request;
determine that at least one robotic device of the plurality of robotic devices is responding to the request to charge the electronic device;
receive, via the network from the at least one robotic device responding to the request to charge the electronic device, an indication of a user interaction with the at least one robotic device; and
authorize the at least one robotic device to charge the electronic device in accordance with the request.

6. The electronic device charging management system of claim 5, wherein authorizing the at least one robotic device to charge the electronic device comprises:
sending, via the network to the at least one robotic device, instructions to charge the electronic device for a duration of time.

7. The electronic device charging management system of claim 5, wherein determining that the at least one robotic device of the plurality of robotic devices is responding to the request to charge the electronic device comprises:
sending the request to charge the electronic device to the plurality of robotic devices; and
receiving, from the at least one robotic device, service information indicating that the at least one robotic device is responding to the request to charge the electronic device.

8. The electronic device charging management system of claim 5, wherein the computing system is further configured to at least:
request capabilities information associated with at least some of the plurality of robotic devices;
receive the capabilities information;
select the at least one robotic device of the plurality of robotic devices based at least in part on the received capabilities information; and
dispatch the at least one robotic device to fulfill the request to charge the electronic device.

9. The electronic device charging management system of claim 5, wherein the at least one robotic device comprises one of a ball robot, a cart-based robot, a multi-legged robot, a quadruped robot, a wheeled robot, a modular snake robot, or a humanoid robot.

10. The electronic device charging management system of claim 5, wherein the request to charge is received from the electronic device, and wherein the request is generated automatically by the electronic device based at least in part on a battery level of the electronic device.

11. The electronic device charging management system of claim 5, wherein the computing system is further configured to at least:
instruct the at least one robotic device to cease charging the electronic device.

12. A non-transitory computer-readable storage medium having stored thereon computer-executable instructions that, when executed by a processor, cause the processor to perform operations comprising:
receiving, from a user, a request to perform an action with respect to an electronic device;
in response to receiving the request, sending information related to the request to one or more robotic devices of a plurality of robotic devices within a proximity of a location of the user, the plurality of robotic devices capable of performing the action with respect to the electronic device;
determining that a robotic device of the plurality of robotic devices is responding to the request to perform the action with respect to the electronic device;
receiving, from the robotic device, an indication that the user has interacted with the robotic device; and
sending instructions to the robotic device to perform the action with respect to the electronic device.

13. The non-transitory computer-readable storage medium of claim 12, wherein the action performed with respect to the electronic device is at least one of leasing the electronic device to the user, charging the electronic device; conducting a virus scan of the electronic device, transferring content to the electronic device, providing the electronic device with access to a network, or providing a software update to the electronic device.

14. The non-transitory computer-readable storage medium of claim 13, wherein the action performed with respect to the electronic device is leasing the electronic device to the user, and wherein the operations further comprise:
receiving, from the user, a request to return the electronic device;
in response to receiving the request to return the electronic device, sending information related to the request to return the electronic device, to one or more robotic devices of a plurality of robotic devices within proximity of a different location of the user;

determining that a particular robotic device of the one or more robotic devices is responding to the request to return the electronic device;

generating instructions for the user to return the electronic device to the particular robotic device; and receiving an indication from the particular robot device that the electronic device has been returned to the particular robot device.

15. The non-transitory computer-readable storage medium of claim 12, wherein the operations further comprise:

receiving one or more communications indicating that the one or more robotic devices of the plurality of robotic devices within a proximity of the location of the user are available;

selecting the robotic device based at least in part on the one or more communications; and providing instructions to the robotic device to respond to the request to perform the action with respect to the electronic device.

16. The non-transitory computer-readable storage medium of claim 15, wherein selecting the robotic device is based at least in part on the one or more communications and a distance between the robotic device and the location of the user.

17. The non-transitory computer-readable storage medium of claim 12, wherein the operations further comprise:

receiving, from the robotic device, payment information provided by the user for performing the action with respect to the electronic device; and processing the payment information.

18. The non-transitory computer-readable storage medium of claim 17, wherein the performed action comprises a purchase of an item using the robotic device.

19. A robotic device comprising:
a power source;
a user interface that enables user interaction with the robotic device;
a communication interface that communicates data via a network; and
a processing unit in communication with the power source, the user interface and the communication interface, the processing unit configured to at least:

receive, via the communication interface, a request from an external computing system to perform an action with respect to an electronic device at a given location;

instruct navigation of the robotic device to the given location;

receive, via the user interface, an indication of a user interaction with the robotic device;

in response to the indication of user interaction, send, via the communication interface, a request to the external computing system for authorization to perform the action;

receive, via the communication interface, authorization from the external computing system to perform the action; and perform the action with respect to the electronic device.

20. The robotic device of claim 19, wherein the robotic device further comprising one or more sensors for collecting sensor data, wherein the processing unit is further configured to cause the one or more sensors to collect sensor data, and wherein instructing the navigation of the robotic device is based on the collected sensor data.

21. The robotic device of claim 19, wherein the user interface is configured to present at least one of visual information, aural information or haptic information.

22. The robotic device of claim 19, further comprising one or more sensors including at least one of a laser sensor, a sonar sensor, an infra-red sensor, a magnetic sensor, a radio frequency identification component, or an imaging device.

23. The robotic device of claim 19, further comprising one or more sensors in communication with the processing unit, wherein the one or more sensors collect at least one of authentication data for authenticating the user, interaction data indicating a user interaction with the robotic device, user navigation data for indication a location of the user, device navigation data for indicating a location of the robotic device, or obstacle information indicating a location of one or more obstacles related to a traversal path of the robotic device.

24. The robotic device of claim 19, wherein the action performed with respect to the electronic device is at least one of leasing the electronic device to the user, charging the electronic device; conducting a virus scan of the electronic device, transferring content to the electronic device, providing the electronic device with access to a network, or providing a software update to the electronic device.

* * * * *